US00RE48860E

(19) United States
(12) Reissued Patent
Chishti et al.

(10) Patent Number: US RE48,860 E
(45) Date of Reissued Patent: *Dec. 21, 2021

(54) ESTIMATING AGENT PERFORMANCE IN A CALL ROUTING CENTER SYSTEM

(71) Applicant: Afiniti, Ltd., Hamilton (BM)

(72) Inventors: Zia Chishti, Washington, DC (US); S. James P. Spottiswoode, Beverly Hills, CA (US)

(73) Assignee: Afiniti, Ltd., Hamilton (BM)

( * ) Notice: This patent is subject to a terminal disclaimer.

(21) Appl. No.: 15/210,763

(22) Filed: Jul. 14, 2016

Related U.S. Patent Documents

Reissue of:
(64) Patent No.: 8,724,797
Issued: May 13, 2014
Appl. No.: 12/869,645
Filed: Aug. 26, 2010

U.S. Applications:
(63) Continuation of application No. 15/153,553, filed on May 12, 2016, which is an application for the reissue of Pat. No. 8,724,797.

(51) Int. Cl.
*H04M 3/523* (2006.01)
*H04M 3/51* (2006.01)

(52) U.S. Cl.
CPC .... *H04M 3/5175* (2013.01); *H04M 2203/401* (2013.01)

(58) Field of Classification Search
CPC ..... H04M 3/5232; H04M 3/523
(Continued)

(56) References Cited

U.S. PATENT DOCUMENTS 5,155,763 A 10/1992 Bigus et al.
5,206,903 A 4/1993 Kohler et al.
(Continued)

FOREIGN PATENT DOCUMENTS

AU 2008349500 C1 5/2014
AU 2009209317 B2 5/2014
(Continued)

OTHER PUBLICATIONS

Afiniti, "Afiniti® Enterprise Behavioral Pairing™ Improves Contact Center Performance," White Paper, retrieved online from URL: <http://www.afinitit,com/wp-content/uploads/2016/04/Afiniti_White-Paper_Web-Email.pdf> 11 pages (2016).
(Continued)

*Primary Examiner* — Nick Corsaro
(74) *Attorney, Agent, or Firm* — Wilmer Cutler Pickering Hale and Dorr LLP

(57) ABSTRACT

Systems and methods are disclosed for estimating and assigning agent performance characteristics in a call routing center. Performance characteristics (e.g., sales rate, customer satisfaction, duration of call, etc.) may be assigned to an agent when the agent has made few calls relative to other agents or otherwise has a large error in their measure of one or more performance characteristics used for matching callers to agents (e.g., via a performance based or pattern matching routing method). A method includes identifying agents of a plurality of agents having a number of calls fewer than a predetermined number of calls (or an error in the performance characteristic exceeding a threshold), assigning a performance characteristic to the identified agents (that is different than the agent's actual performance characteristic), and routing a caller to one of the plurality of agents based on the performance characteristics of the plurality of agents.

27 Claims, 13 Drawing Sheets

(58) Field of Classification Search
USPC ..... 379/265.11, 266
See application file for complete search history.

(56) References Cited

U.S. PATENT DOCUMENTS 5,327,490 A 7/1994 Cave
5,537,470 A 7/1996 Lee
5,702,253 A 12/1997 Bryce et al.
5,825,869 A 10/1998 Brooks et al.
5,903,641 A 5/1999 Tonisson ..... H04M 3/5233 379/265.12
5,907,601 A 5/1999 David et al.
5,926,538 A 7/1999 Deryugin et al.
6,049,603 A 4/2000 Schwartz et al.
6,052,460 A 4/2000 Fisher et al.
6,064,731 A 5/2000 Flockhart et al.
6,088,444 A 7/2000 Walker et al.
6,163,607 A 12/2000 Bogart et al.
6,222,919 B1 4/2001 Hollatz et al.
6,292,555 B1 9/2001 Okamoto
6,324,282 B1 11/2001 McIllwaine et al.
6,333,979 B1 12/2001 Bondi et al.
6,389,132 B1 5/2002 Price
6,389,400 B1 5/2002 Bushey et al. ..... G06Q 10/063112 705/7.14
6,408,066 B1 6/2002 Andruska et al.
6,411,687 B1 6/2002 Bohacek et al.
6,424,709 B1 7/2002 Doyle et al.
6,434,230 B1 8/2002 Gabriel
6,496,580 B1 12/2002 Chack
6,504,920 B1 1/2003 Okon et al.
6,519,335 B1 2/2003 Bushnell
6,526,135 B1 2/2003 Paxson
6,535,600 B1 3/2003 Fisher et al.
6,535,601 B1 3/2003 Flockhart et al.
6,570,980 B1 5/2003 Baruch
6,587,556 B1 7/2003 Judkins et al.
6,603,854 B1 8/2003 Judkins et al.
6,639,976 B1 10/2003 Shellum et al.
6,661,889 B1 12/2003 Flockhart et al.
6,704,410 B1 * 3/2004 McFarlane et al. ..... 379/265.05
6,707,904 B1 3/2004 Judkins et al.
6,714,643 B1 3/2004 Gargeya et al.
6,744,878 B1 6/2004 Komissarchik et al.
6,763,104 B1 7/2004 Judkins et al.
6,774,932 B1 8/2004 Ewing et al.
6,775,378 B1 8/2004 Villena et al.
6,798,876 B1 9/2004 Bala
6,829,348 B1 12/2004 Schroeder et al.
6,832,203 B1 12/2004 Villena et al.
6,859,529 B2 2/2005 Duncan et al.
6,895,083 B1 * 5/2005 Bers ..... H04M 3/5232 379/266.02
6,922,466 B1 7/2005 Peterson et al.
6,937,715 B2 8/2005 Delaney
6,956,941 B1 10/2005 Duncan et al.
6,970,821 B1 11/2005 Shambaugh et al.
6,978,006 B1 12/2005 Polcyn
7,023,979 B1 4/2006 Wu et al.
7,039,166 B1 5/2006 Peterson et al.
7,050,566 B2 5/2006 Becerra et al.
7,050,567 B1 5/2006 Jensen
7,062,031 B2 6/2006 Becerra et al.
7,068,775 B1 6/2006 Lee
7,092,509 B1 8/2006 Mears et al.
7,103,172 B2 9/2006 Brown et al.
7,158,628 B2 1/2007 McConnell et al.
7,184,540 B2 2/2007 Dezonno et al.
7,209,549 B2 4/2007 Reynolds et al.
7,231,032 B2 6/2007 Nevman et al.
7,231,034 B1 6/2007 Rikhy et al.
7,236,584 B2 6/2007 Torba
7,245,716 B2 7/2007 Brown et al.
7,245,719 B2 7/2007 Kawada et al.
7,266,251 B2 9/2007 Rowe
7,269,253 B1 9/2007 Wu et al.
7,353,388 B1 4/2008 Gilman et al.
7,398,224 B2 7/2008 Cooper
7,593,521 B2 9/2009 Becerra et al.
7,676,034 B1 3/2010 Wu et al.
7,725,339 B1 5/2010 Aykin
7,734,032 B1 6/2010 Kiefhaber et al.
7,798,876 B2 9/2010 Mix
7,826,597 B2 11/2010 Berner et al.
7,864,944 B2 1/2011 Khouri et al.
7,899,177 B1 3/2011 Bruening et al.
7,916,858 B1 3/2011 Heller et al.
7,940,917 B2 5/2011 Lauridsen et al.
7,961,866 B1 6/2011 Boutcher et al.
7,995,717 B2 8/2011 Conway et al.
8,000,989 B1 8/2011 Kiefhaber et al.
8,010,607 B2 8/2011 McCormack et al.
8,094,790 B2 1/2012 Conway et al.
8,126,133 B1 2/2012 Everingham et al.
8,140,441 B2 3/2012 Cases et al.
8,175,253 B2 5/2012 Knott et al.
8,229,102 B2 7/2012 Knott et al.
8,249,245 B2 8/2012 Jay et al.
8,295,471 B2 10/2012 Spottiswoode et al.
8,300,798 B1 10/2012 Wu et al.
8,359,219 B2 1/2013 Chishti et al.
8,433,597 B2 4/2013 Chishti et al.
8,472,611 B2 6/2013 Chishti
8,565,410 B2 10/2013 Chishti et al.
8,634,542 B2 1/2014 Spottiswoode et al.
8,644,490 B2 2/2014 Stewart
8,670,548 B2 3/2014 Xie et al.
8,699,694 B2 4/2014 Chishti et al.
8,712,821 B2 4/2014 Spottiswoode
8,718,271 B2 5/2014 Spottiswoode
8,724,797 B2 5/2014 Chishti et al.
8,731,178 B2 5/2014 Chishti et al.
8,737,595 B2 5/2014 Chishti et al.
8,750,488 B2 6/2014 Spottiswoode et al.
8,761,380 B2 6/2014 Kohler et al.
8,781,100 B2 7/2014 Spottiswoode et al.
8,781,106 B2 7/2014 Afzal
8,792,630 B2 7/2014 Chishti et al.
8,824,658 B2 9/2014 Chishti
8,831,207 B1 9/2014 Agarwal
8,879,715 B2 11/2014 Spottiswoode et al.
8,903,079 B2 12/2014 Xie et al.
8,913,736 B2 12/2014 Kohler et al.
8,929,537 B2 1/2015 Chishti et al.
8,938,063 B1 1/2015 Hackbarth et al.
8,995,647 B2 3/2015 Li et al.
9,020,137 B2 4/2015 Chishti et al.
9,025,757 B2 5/2015 Spottiswoode et al.
9,215,323 B2 12/2015 Chishti
9,277,055 B2 3/2016 Spottiswoode et al.
9,300,802 B1 3/2016 Chishti
9,426,296 B2 8/2016 Chishti et al.
9,712,676 B1 7/2017 Chishti
9,712,679 B2 7/2017 Chishti et al.
RE46,986 E 8/2018 Chishti et al.
10,116,800 B1 10/2018 Kan et al.
10,135,987 B1 11/2018 Chishti et al.
RE47,201 E 1/2019 Chishti et al.
10,284,727 B2 5/2019 Kan et al.
10,404,861 B2 9/2019 Kan et al.
2001/0032120 A1 10/2001 Stuart et al.
2002/0018554 A1 2/2002 Jensen et al.
2002/0046030 A1 4/2002 Haritsa et al.
2002/0059164 A1 5/2002 Shtivelman
2002/0082736 A1 6/2002 Lech et al.
2002/0110234 A1 8/2002 Walker et al.
2002/0111172 A1 8/2002 DeWolf et al.
2002/0131399 A1 9/2002 Philonenko
2002/0138285 A1 9/2002 DeCotiis et al.
2002/0143599 A1 10/2002 Nourbakhsh et al.
2002/0161765 A1 10/2002 Kundrot et al.
2002/0184069 A1 12/2002 Kosiba et al.
2002/0196845 A1 12/2002 Richards et al.

(56) References Cited

U.S. PATENT DOCUMENTS

2003/0002653 A1 1/2003 Uckun
2003/0081757 A1 5/2003 Mengshoel et al.
2003/0095652 A1 5/2003 Mengshoel et al.
2003/0169870 A1 9/2003 Stanford
2003/0174830 A1 9/2003 Boyer et al.
2003/0217016 A1 11/2003 Pericle
2003/0225659 A1* 12/2003 Breeden ..... G06Q 40/00 705/36 R
2004/0028211 A1 2/2004 Culp et al.
2004/0057416 A1 3/2004 McCormack
2004/0096050 A1 5/2004 Das et al.
2004/0098274 A1 5/2004 Dezonno et al.
2004/0101127 A1 5/2004 Dezonno et al.
2004/0109555 A1 6/2004 Williams
2004/0133434 A1 7/2004 Szlam et al.
2004/0210475 A1 10/2004 Starnes et al.
2004/0230438 A1 11/2004 Pasquale et al.
2004/0267816 A1 12/2004 Russek
2005/0013428 A1 1/2005 Walters
2005/0043986 A1 2/2005 McConnell et al. ..... H04M 3/5232 379/265.02
2005/0047581 A1 3/2005 Shaffer et al.
2005/0047582 A1 3/2005 Shaffer et al.
2005/0071223 A1 3/2005 Jain et al.
2005/0129212 A1 6/2005 Parker
2005/0135593 A1* 6/2005 Becerra ..... H04M 3/5166 379/220.01
2005/0135596 A1 6/2005 Zhao
2005/0187802 A1 8/2005 Koeppel
2005/0195960 A1 9/2005 Shaffer et al.
2005/0286709 A1 12/2005 Horton et al.
2006/0098803 A1 5/2006 Bushey et al.
2006/0110052 A1 5/2006 Finlayson
2006/0124113 A1 6/2006 Roberts, Sr.
2006/0184040 A1 8/2006 Keller et al.
2006/0222164 A1 10/2006 Contractor et al.
2006/0233346 A1 10/2006 McIlwaine et al.
2006/0262918 A1 11/2006 Karnalkar et al.
2006/0262922 A1 11/2006 Margulies et al.
2007/0036323 A1 2/2007 Travis
2007/0071222 A1 3/2007 Flockhart et al.
2007/0116240 A1 5/2007 Foley et al.
2007/0121602 A1 5/2007 Sin et al.
2007/0121829 A1 5/2007 Tal et al.
2007/0136342 A1 6/2007 Singhai et al.
2007/0154007 A1 7/2007 Bernhard
2007/0174111 A1 7/2007 Anderson et al.
2007/0198322 A1 8/2007 Bourne et al.
2007/0219816 A1 9/2007 Van Luchene et al.
2007/0274502 A1 11/2007 Brown
2008/0002823 A1 1/2008 Fama et al.
2008/0008309 A1 1/2008 Dezonno et al.
2008/0046386 A1 2/2008 Pieraccinii et al.
2008/0065476 A1 3/2008 Klein et al.
2008/0118052 A1 5/2008 Houmaidi et al.
2008/0144803 A1 6/2008 Jaiswal et al.
2008/0152122 A1 6/2008 Idan et al.
2008/0181389 A1 7/2008 Bourne et al.
2008/0199000 A1* 8/2008 Su et al. ..... 379/265.06
2008/0205611 A1 8/2008 Jordan et al.
2008/0267386 A1 10/2008 Cooper
2008/0273687 A1 11/2008 Knott et al.
2009/0043670 A1 2/2009 Johansson et al.
2009/0086933 A1 4/2009 Patel et al.
2009/0190740 A1 7/2009 Chishti et al.
2009/0190743 A1 7/2009 Spottiswoode
2009/0190744 A1 7/2009 Xie et al.
2009/0190745 A1 7/2009 Xie et al.
2009/0190746 A1 7/2009 Chishti et al.
2009/0190747 A1 7/2009 Spottiswoode
2009/0190748 A1 7/2009 Chishti et al.
2009/0190749 A1 7/2009 Xie et al.
2009/0190750 A1 7/2009 Xie et al.
2009/0232294 A1 9/2009 Xie et al.
2009/0234710 A1 9/2009 Hassine
2009/0245493 A1 10/2009 Chen et al.
2009/0304172 A1 12/2009 Becerra et al.
2009/0318111 A1 12/2009 Desai et al.
2009/0323921 A1 12/2009 Spottiswoode et al.
2010/0020959 A1 1/2010 Spottiswoode
2010/0020961 A1 1/2010 Spottiswoode
2010/0054431 A1 3/2010 Jaiswal et al.
2010/0054452 A1 3/2010 Afzal
2010/0054453 A1 3/2010 Stewart
2010/0086120 A1 4/2010 Brussat et al.
2010/0111285 A1 5/2010 Chishti
2010/0111286 A1 5/2010 Chishti
2010/0111287 A1 5/2010 Xie et al.
2010/0111288 A1 5/2010 Afzal et al.
2010/0142698 A1 6/2010 Spottiswoode et al.
2010/0158238 A1 6/2010 Saushkin
2010/0183138 A1 7/2010 Spottiswoode et al.
2011/0022357 A1 1/2011 Vock et al.
2011/0031112 A1 2/2011 Birang et al.
2011/0069821 A1 3/2011 Korolev et al.
2011/0125048 A1 5/2011 Causevic et al.
2012/0051536 A1 3/2012 Chishti et al.
2012/0051537 A1 3/2012 Chishti et al.
2012/0224680 A1 9/2012 Spottiswoode et al.
2012/0278136 A1 11/2012 Flockhart et al.
2013/0003959 A1 1/2013 Nishikawa et al.
2013/0251137 A1 9/2013 Chishti et al.
2013/0287202 A1 10/2013 Flockhart et al.
2014/0044246 A1 2/2014 Klemm et al.
2014/0079210 A1 3/2014 Kohler et al.
2014/0119531 A1 5/2014 Tuchman et al.
2014/0119533 A1 5/2014 Spottiswoode et al.
2014/0341370 A1 11/2014 Li et al.
2015/0055772 A1 2/2015 Klemm et al.
2015/0281448 A1 10/2015 Putra et al.
2016/0080573 A1 3/2016 Chishti

FOREIGN PATENT DOCUMENTS

AU 2009311534 B2 8/2014
CN 102301688 B 5/2014
CN 102017591 B 11/2014
EP 0493292 A2 7/1992
EP 0949793 A1 10/1999
EP 1032188 A1 8/2000
EP 1335572 A2 8/2003
JP 11-098252 A 4/1999
JP 2000-069168 A 3/2000
JP 2000-078291 A 3/2000
JP 2000-078292 3/2000
JP 2000-078292 A 3/2000
JP 2000-092213 3/2000
JP 2000-092213 A 3/2000
JP 2000-236393 8/2000
JP 2000-236393 A 8/2000
JP 2001-292236 10/2001
JP 2001-292236 A 10/2001
JP 2001-518753 10/2001
JP 2001-518753 A 10/2001
JP 2002-297900 10/2002
JP 2002-297900 A 10/2002
JP 3366565 1/2003
JP 3366565 B2 1/2003
JP 2003-187061 A 7/2003
JP 2004-056517 A 2/2004
JP 2004-227228 8/2004
JP 2004-227228 A 8/2004
JP 2006-345132 A 12/2006
JP 2007-324708 12/2007
JP 2007-324708 A 12/2007
JP 2011-511533 A 4/2011
JP 2011-511536 A 4/2011
JP 5421928 B2 2/2014
JP 5631326 B2 11/2014
JP 5649575 B2 1/2015
JP 2015-514371 A 5/2015
MX 316118 12/2013
MX 322251 7/2014

(56) References Cited

FOREIGN PATENT DOCUMENTS

| | | | |
|---|---|---|---|
| NZ | 587100 | B | 10/2013 |
| NZ | 587101 | B | 10/2013 |
| NZ | 591486 | B | 1/2014 |
| NZ | 592781 | B | 3/2014 |
| PH | 1-2010-501704 | | 2/2014 |
| PH | 1-2010-501705 | | 2/2015 |
| WO | WO-99/17517 | | 4/1999 |
| WO | WO-1999/17517 | A1 | 4/1999 |
| WO | WO-01/63894 | | 8/2001 |
| WO | WO-2001/063894 | A2 | 8/2001 |
| WO | WO-2006/124113 | A2 | 11/2006 |
| WO | WO-2009/097018 | A1 | 8/2009 |
| WO | WO-2010/053701 | A2 | 5/2010 |
| WO | WO-2011/081514 | | 7/2011 |
| WO | WO-2011/081514 | A1 | 7/2011 |

OTHER PUBLICATIONS

Anonymous, "Performance Based Routing in Profit Call Centers," The Decision Makers' Direct, located at www.decisioncraft.com, Issue Jun. 2002, (3 pages).
Canadian Office Action issued in Canadian Patent Application No. 2713526, dated Oct. 25, 2016, 7 pages.
Cleveland, William S., "Robust Locally Weighted Regression and Smoothing Scatterplots," Journal of the American Statistical Association, vol. 74, No. 368, Dec. 1979, pp. 829-836 (8 pages).
Extended European Search Report issued by the European Patent Office for European Application No. 18168620.5 dated Jun. 12, 2018 (9 pages).
Extended European Search Report issued by the European Patent Office for European Patent Application No. 17154781.3 dated May 4, 2017, (7 pages).
Extended European Search Report issued by the European Patent Office for European Patent Application No. 17171761.4 dated Aug. 30, 2017, (8 pages).
Gans, N. et al., "Telephone Call Centers: Tutorial, Review and Research Prospects," Manufacturing & Service Operations Management, vol. 5, No. 2, 2003, pp. 79-141, (84 pages).
International Preliminary Report on Patentability issued in connection with PCT Application No. PCT/US2009/066254 dated Jun. 14, 2011 (6 pages).
International Search Report and Written Opinion issued by the European Patent Office as International Searching Authority for International Application No. PCT/IB2016/001762 dated Feb. 20, 2017 (15 pages).
International Search Report and Written Opinion issued by the European Patent Office as International Searching Authority for International Application No. PCT/IB2016/001776 dated Mar. 3, 2017 (16 pages).
International Search Report and Written Opinion issued by the European Patent Office as International Searching Authority for International Application No. PCT/IB2017/000570 dated Jun. 30, 2017 (13 pages).
International Search Report issued in connection with International Application No. PCT/US13/33268 dated May 31, 2013 (2 pages).
International Search Report issued in connection with PCT Application No. PCT/US/2009/054352 dated Mar. 12, 2010, 5 pages.
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
Japanese Office Action issued by the Japan Patent Office for Application No. 2015-503396 dated Jun. 29, 2016 (7 pages).
Japanese Office Action issued by the Japanese Patent Office for Japanese Application No. 2016-159338 dated Oct. 11, 2017 (12 pages).
Japanese Office Action issued by the Japanese Patent Office for Japanese Application No. 2016-189126 dated Oct. 19, 2017 (24 pages).
Koole, G. (2004). "Performance Analysis and Optimization in Customer Contact Centers," Proceedings of the Quantitative Evaluation of Systems, First International Conference, Sep. 27-30, 2004 (4 pages).
Ntzoufras, "Bayesian Modeling Using Winbugs". Wiley Interscience, Chapter 5, Normal Regression Models, Oct. 18, 2007, Redacted version, pp. 155-220 (67 pages).
Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).
Stanley et al., "Improving Call Center Operations Using Performance-Based Routing Strategies," California Journal of Operations Management, 6(1), Feb. 24-32, 2008; retrieved from http://userwww.sfsu.edu/saltzman/Publist.html (9 pages).
Subsequent Substantive Examination Report issued in connection with Philippines Application No. 1-2010-501705 dated Jul. 14, 2014 (1 page).
Substantive Examination Report issued in connection with Philippines Application No. 1/2011/500868 dated May 2, 2014 (1 page).
Written Opinion of the International Searching Authority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 24, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.
Chen, G., et al., "Enhanced Locality Sensitive Clustering in High Dimensional Space", Transactions on Electrical and Electronic Materials, vol. 15, No. 3, Jun. 25, 2014, pp. 125-129 (5 pages).
Cormen, T.H., et al.,"Introduction to Algorithms", Third Edition, Chapter 26 and 29, 2009, (116 pages).
Ioannis Ntzoufras "Bayesian Modeling Using Winbugs An Introduction", Department of Statistics, Athens University of Economics and Business, Wiley-Interscience, A John Wiley & Sons, Inc., Publication, Chapter 5, Jan. 1, 2007, pp. 155-220 (67 pages).
Nocedal, J. and Wright, S. J., "Numerical Optimization," Chapter 16 Quadratic Programming, 2006, pp. 448-496 (50 pages).
Us. Appl. No, 13/221,692, filed Aug. 30, 2011, Spottiswoode et al.
U.S. Appl. No. 13/715,765, filed Dec. 14, 2012, Zia Chishti et al.
U.S. Appl. No. 13/843,724, filed Mar. 15, 2013, Spottiswoode et al.
U.S. Appl. No. 13/843,541, filed Mar. 15, 2013, Zia Chisti et al.
U.S. Appl. No. 13/843,807, filed Mar. 15, 2013, Spottiswoode et al.
U.S. Appl. No. 13/854,825, filed Apr. 1, 2013, Zia Chisti et al.
Gans, N. et al. (2003). "Telephone Call Centers: Tutorial, Review and Research Prospects," Manuscript, pp. 1-81.
International Search Report mailed Jul. 6, 2010 issued in connection with PCT/US2009/061537.
Koole, G. et al. (Mar. 6, 2006). "An Overview of Routing and Staffing Algorithms in Multi-Skill Customer Contact Centers," Manuscript, 42 pages.

(56) References Cited

OTHER PUBLICATIONS

Notice of Allowance dated Jun. 29, 2012 issued in connection with U.S. Appl. No. 12/355,618.
Notice of Allowance dated Sep. 19, 2012 issued in connection with U.S. Appl. No. 12/180,382.
Notice of Allowance dated Feb. 28, 2013 issued in connection with U.S. Appl. No. 12/331,201.
Notice of Allowance dated Apr. 11, 2013 issued in connection with U.S. Appl. No. 12/869,654.
Notice of Allowance dated Apr. 10, 2013 issued in connection with U.S. Appl. No. 12/266,461.
Office Action dated Jan. 19, 2012 issued in connection with U.S. Appl. No. 12/266,415.
Office Action dated Jan. 23, 2012 issued in connection with U.S. Appl. No. 12/331,186.
Office Action dated Feb. 3, 2012 issued in connection with U.S. Appl. No. 12/202,091.
Office Action dated Feb. 3, 2012 issued in connection with U.S. Appl. No. 12/202,097.
Office Action dated Mar. 1, 2012 issued in connection with U.S. Appl. No. 12/180,382.
Office Action dated Mar. 2, 2012 issued in connection with U.S. Appl. No. 12/267,459.
Office Action dated Mar. 15, 2012 issued in connection with U.S. Appl. No. 12/202,101.
Office Action dated Mar. 19, 2012 issued in connection with U.S. Appl. No. 12/490,949.
Office Action dated Mar. 30, 2012 issued in connection with U.S. Appl. No. 12/267,471.
Office Action dated Apr. 6, 2012 issued in connection with U.S. Appl. No. 12/021,251.
Office Action dated Apr. 16, 2012 issued in connection with U.S. Appl. No. 12/331,210.
Office Action dated Apr. 18, 2012 issued in connection with U.S. Appl. No. 12/266,418.
Office Action dated May 11, 2012 issued in connection with U.S. Appl. No. 12/266,415.
Office Action dated May 11, 2012 issued in connection with U.S. Appl. No. 12/331,195.
Office Action dated Jun. 7, 2012 issued in connection with U.S. Appl. No. 12/331,181.
Office Action dated Jun. 7, 2012 issued in connection with U.S. Appl. No. 12/355,602.
Office Action dated Jun. 8, 2012 issued in connection with U.S. Appl. No. 12/266,446.
Office Action dated Jun. 18, 2012 issued in connection with U.S. Appl. No. 12/331,201.
Office Action dated Jun. 29, 2012 issued in connection with U.S. Appl. No. 12/331,153.
Office Action dated Aug. 4, 2011 issued in connection with U.S. Appl. No. 12/267,459.
Office Action dated Aug. 9, 2011 issued in connection with U.S. Appl. No. 12/202,101.
Office Action dated Aug. 19, 2011 issued in connection with U.S. Appl. No. 12/202,097.
Office Action dated Aug. 19, 2011 issued in connection with U.S. Appl. No. 12/331,186.
Office Action dated Aug. 23, 2011 issued in connection with U.S. Appl. No. 12/180,382.
Office Action dated Sep. 6, 2011 issued in connection with U.S. Appl. No. 12/202,091.
Office Action dated Sep. 12, 2011 issued in connection with U.S. Appl. No. 12/266,446.
Office Action dated Sep. 13, 2011 issued in connection with U.S. Appl. No. 12/331,181.
Office Action dated Sep. 15, 2011 issued in connection with U.S. Appl. No. 12/266,418.
Office Action dated Sep. 19, 2011 issued in connection with U.S. Appl. No. 12/021,251.
Office Action dated Sep. 23, 2011 issued in connection with U.S. Appl. No. 12/355,602.
Office Action dated Sep. 26, 2011 issued in connection with U.S. Appl. No. 12/331,153.
Office Action dated Sep. 26, 2011 issued in connection with U.S. Appl. No. 12/355,618.
Office Action dated Jan. 15, 2013 issued in connection with U.S. Appl. No. 12/267,471.
Office Action dated Jan. 3, 2013 issued in connection with U.S. Appl. No. 12/331,210.
Office Action dated Jan. 30, 2013 issued in connection with Chinese Application No. 20098011060.8, with English translation.
Office Action dated Jan. 31, 2013 issued in connection with U.S. Appl. No. 12/331,161.
Office Action dated Oct. 7, 2011 issued in connection with U.S. Appl. No. 12/331,195.
Office Action dated Oct. 7, 2011 issued in connection with U.S. Appl. No. 12/331,210.
Office Action dated Oct. 9, 2012 issued in connection with U.S. Appl. No. 12/202,101.
Office Action dated Oct. 11, 2012 issued in connection with U.S. Appl. No. 12/267,459.
Office Action dated Oct. 29, 2012 issued in connection with U.S. Appl. No. 12/490,949.
Office Action dated Nov. 1, 2012 issued in connection with Chinese Application No. 20088012833.6, with English translation.
Office Action dated Nov. 1, 2012 issued in connection with Mexican Application No. MX/a/2010/008238.
Office Action dated Nov. 1, 2012 issued in connection with Mexican Application No. MX/a/2011/002272.
Office Action dated Dec. 13, 2012 issued in connection with U.S. Appl. No. 12/355,602.
Office Action dated Dec. 28, 2012 issued in connection with U.S. Appl. No. 12/266,461.
Office Action dated Dec. 31, 2012 issued in connection with U.S. Appl. No. 12/869,654.
Office Action dated Feb. 21, 2013 issued in connection with Japanese Patent Application No. 2010-544292.
Office Action dated Mar. 28, 2013 issued in connection with U.S. Appl. No. 13/221,692.
Office Action dated Aug. 31, 2012 issued in connection with Mexican Patent Application No. Mx/a/2011/004815.
Office Action dated Jan. 8, 2013 issued in connection with Australian Patent Application No. 2008349500.
Office Action dated Jan. 8, 2013 issued in connection with Australian Patent Application No. 2009209317.
Office Action dated Mar. 20, 2013 issued in connection with U.S. Appl. No. 12/331,153.
Office Action dated May 21, 2013 issued in connection with U.S. Appl. No. 12/267,459.
Office Action mailed Apr. 24, 2013 issued in connection with Mexican Patent Application No. Mx/a/2011/004815.
Riedmiller, M. et al. (1993). "A Direct Adaptive Method for Faster BackpropagationLearning: The RPROP Algorithm," 1993 IEEE International Conference on Neural Networks, San Francisco, CA, Mar. 28-Apr. 1, 1993, 1:586-591.
Notice of Allowance dated Oct. 4, 2013 issued in connection with U.S. Appl. No. 12/202,101.
Notice of Allowance dated Sep. 18, 2013 issued in connection with U.S. Appl. No. 12/331,153.
Notice of Allowance dated Sep. 5, 2013 issued in connection with U.S. Appl. No. 12/331,161.
Notice of Allowance mailed Jul. 8, 2013, issued in connection with U.S. Appl. No. 13/843,541.
Notification of Transmittal of the International Search Report and the Written Opinion of the International Searching Authority, or the Declaration mailed Jul. 9, 2013 issued in connection with PCT/US2013/33265.
Office Action dated Oct. 21, 2013 issued in connection with U.S. Appl. No. 12/331,210.
Office Action dated Jul. 5, 2013 issued in connection with Mexican Application No. MX/a/2011/002272.

(56) References Cited

OTHER PUBLICATIONS

Office Action dated Jul. 9, 2013 issued in connection with Chinese Application No. 200980142771.1, with English translation.
Office Action dated Aug. 13, 2013 issued in connection with U.S. Appl. No. 13/854,825.
Office Action dated Aug. 28, 2013 issued in connection with Chinese Application No. 200980153730.2, with English translation.
Office Action dated Sep. 23, 2013 issued in connection with U.S. Appl. No. 12/331,186.
Office Action dated Sep. 24, 2013 issued in connection with U.S. Appl. No. 12/202,097.
Office Action dated Jul. 30, 2013 issued in connection with U.S. Appl. No. 12/331,181.
Office Action dated Jun. 7, 2013 issued in connection with Japanese Patent Application No. 2010-544399.
Office Action mailed Jul. 2, 2013 in connection with Mexican Application No. MX/a/2010/008238.
Third Office Action dated Aug. 29, 2013 issued in connection with Chinese Application No. 2008801283369.
Written Opinion dated Jun. 14, 2013 issued in connection with PCT/US2013/033261.
Mexican Office Action mailed Dec. 17, 2013 issued in connection with Application No. MX/a/2010/008238.
Notice of Allowance mailed Nov. 18, 2013 issued in connection with U.S. Appl. No. 13/854,825.
Notice of Allowance mailed Dec. 23, 2013 issued in connection with U.S. Appl. No. 12/869,654.
Notice of Allowance mailed Nov. 26, 2013 issued in connection with U.S. Appl. No. 12/331,181.
Notice of Reasons for Rejection mailed Dec. 20, 2013 issued in connection with Japanese Application No. 2010-544399 with English translation.
Office Action dated Nov. 5, 2013 issued in connection with U.S. Appl. No. 13/715,765.
Office Action dated Dec. 17, 2013 issued in connection with U.S. Appl. No. 12/331,195.
Office Action dated Nov. 6, 2013 issued in connection with U.S. Appl. No. 13/221,692.
Office Action mailed Nov. 5, 2013 issued in connection with U.S. Appl. No. 12/267,471.
Office Action mailed Dec. 10, 2013 issued in connection with U.S. Appl. No. 14/032,657.
Office Action mailed Oct. 22, 2013 issued in connection with Japanese Application No. 2011-525099.

* cited by examiner

ESTIMATING AGENT PERFORMANCE IN A CALL ROUTING CENTER SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Note: More than one reissue patent application has been filed for the reissue of U.S. Pat. No. 8,724,797. The reissue patent applications are U.S. Reissue patent application Ser. No. 15/153,553, filed May 12, 2016, U.S. Reissue patent application Ser. No. 15/210,779, filed Jul. 14, 2016, and the present U.S. Reissue patent application Ser. No. 15/210,763, filed Jul. 14, 2016, which is a continuation reissue application of U.S. Reissue patent application Ser. No. 15/153,553, filed May 12, 2016.*

BACKGROUND

1. Field

The present invention relates generally to the field of routing phone calls and other telecommunications in a call routing center system, and in particular, to methods and system for matching callers to agents based on performance and pattern matching algorithms.

2. Related Art

The typical contact center consists of a number of human agents, with each assigned to a telecommunication device, such as a phone or a computer for conducting email or Internet chat sessions, that is connected to a central switch. Using these devices, the agents are generally used to provide sales, customer service, or technical support to the customers or prospective customers of a contact center or a contact center's clients.

Typically, a contact center or client will advertise to its customers, prospective customers, or other third parties a number of different contact numbers or addresses for a particular service, such as for billing questions or for technical support. The customers, prospective customers, or third parties seeking a particular service will then use this contact information, and the incoming caller will be routed at one or more routing points to a human agent at a contact center who can provide the appropriate service. Contact centers that respond to such incoming contacts are typically referred to as "inbound contact centers."

Similarly, a contact center can make outgoing contacts to current or prospective customers or third parties. Such contacts may be made to encourage sales of a product, provide technical support or billing information, survey consumer preferences, or to assist in collecting debts. Contact centers that make such outgoing contacts are referred to as "outbound contact centers."

In both inbound contact centers and outbound contact centers, the individuals (such as customers, prospective customers, survey participants, or other third parties) that interact with contact center agents using a telecommunication device are referred to in this application as a "caller." The individuals acquired by the contact center to interact with callers are referred to in this application as an "agent."

Conventionally, a contact center operation includes a switch system that connects callers to agents. In an inbound contact center, these switches route incoming callers to a particular agent in a contact center, or, if multiple contact centers are deployed, to a particular contact center for further routing. In an outbound contact center employing telephone devices, dialers are typically employed in addition to a switch system. The dialer is used to automatically dial a phone number from a list of phone numbers, and to determine whether a live caller has been reached from the phone number called (as opposed to obtaining no answer, a busy signal, an error message, or an answering machine). When the dialer obtains a live caller, the switch system routes the caller to a particular agent in the contact center.

Routing technologies have accordingly been developed to optimize the caller experience. For example, U.S. Pat. No. 7,236,584 describes a telephone system for equalizing caller waiting times across multiple telephone switches, regardless of the general variations in performance that may exist among those switches. Contact routing in an inbound contact center, however, is a process that is generally structured to connect callers to agents that have been idle for the longest period of time. In the case of an inbound caller where only one agent may be available, that agent is generally selected for the caller without further analysis. In another example, if there are eight agents at a contact center, and seven are occupied with contacts, the switch will generally route the inbound caller to the one agent that is available. If all eight agents are occupied with contacts, the switch will typically put the contact on hold and then route it to the next agent that becomes available. More generally, the contact center will set up a queue of incoming callers and preferentially route the longest-waiting callers to the agents that become available over time. Such a pattern of routing contacts to either the first available agent or the longest-waiting agent is referred to as "round-robin" contact routing. In round robin contact routing, eventual matches and connections between a caller and an agent are essentially random.

Some attempts have been made to improve upon these standard yet essentially random processes for connecting a caller to an agent. For example, U.S. Pat. No. 7,209,549 describes a telephone routing system wherein an incoming caller's language preference is collected and used to route their telephone call to a particular contact center or agent that can provide service in that language. In this manner, language preference is the primary driver of matching and connecting a caller to an agent, although once such a preference has been made, callers are almost always routed in "round-robin" fashion.

BRIEF SUMMARY

According to one aspect of the present invention, a process is described for assigning agents in a call center with one or more performance characteristics for use in a routing process based on agent performance. Broadly speaking, and in one example, agent performance characteristics (e.g., sales rates, customer satisfaction scores, duration of calls, etc.) may be assigned to an agent when the agent has made few (or no) calls relative to other agents or otherwise has a large error in their measure of one or more performance characteristics used for matching callers to agents (e.g., via a performance based or pattern matching routing method). As an agent makes more calls, or the error decreases, the assigned agent performance characteristic may be adjusted or returned to an actual performance characteristic for the agent.

In one example, a method includes identifying agents of a plurality of agents (e.g., all agents of a call routing center or a subset thereof) having a number of calls fewer than a predetermined number of calls. The number of calls may be based on various factors relating to fractional errors, relative to an average number of calls, selected and adjusted by a call center manager, and so on. The method further includes assigning a performance characteristic to the identified agents that is different than the agent's actual performance characteristic. Callers are then routed or matched to agents of the plurality of agents based, at least in part, on the performance characteristics of the plurality of agents (including the assigned performance characteristics of those identified having a number of calls fewer than the predetermined number of calls and the actual performance characteristic of the other agents).

The assigned performance characteristic may include, or be based on, an average or historical performance characteristic of the plurality of agents. In some examples, the assigned performance characteristic may be based on an agent's demographic data, e.g., using actual agent performance of agents having similar demographic data, to estimate performance. In other examples, the assigned agent performance characteristic may include an adjustment to an actual performance characteristic of the one or more identified agents. The adjustment may include an interpolation between an actual performance characteristic of the identified agent and an average performance characteristic of the plurality of agents.

In another example, a method includes determining performance characteristics for a plurality of agents, determining an average performance characteristic for the plurality of agents, and determining an error (e.g., a fractional or percentage error) in the performance characteristic for each of the plurality of agents. Agents having an error greater than a predetermined threshold may be assigned a performance characteristic different than their actual performance characteristic. The method further including routing a caller to one of the plurality of agents based on the performance characteristics of the plurality of agents and the assigned performance characteristic of the identified agent(s).

In one example, exemplary routing or matching methods using the actual and assigned performance characteristics may include performance based matching (e.g., ranking a set of agents based on performance and preferentially matching callers to the agents based on a performance ranking or score), pattern matching algorithms (e.g., comparing agent data associated with a set of callers to agent data associated a set of agents and determining a suitability score of different caller-agent pairs), affinity data matching, and other models for matching callers to agents. The methods may therefore operate to output scores or rankings of the callers, agents, and/or caller-agent pairs for a desired optimization (e.g., for optimizing cost, revenue, customer satisfaction, and so on).

Additionally, an interface may be presented to a user allowing for adjustment of various features of the routing system, e.g., a slider or selector for adjusting the threshold values, performance characteristic(s), and so on, in real-time or a predetermined time. The interface may allow a user to turn certain methods on and off, change desired optimizations, and may display an estimated effect of a change in a threshold value (e.g., number of calls or error).

Many of the techniques described here may be implemented in hardware, firmware, software, or combinations thereof. In one example, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

DETAILED DESCRIPTION OF THE INVENTION

Figure 1:
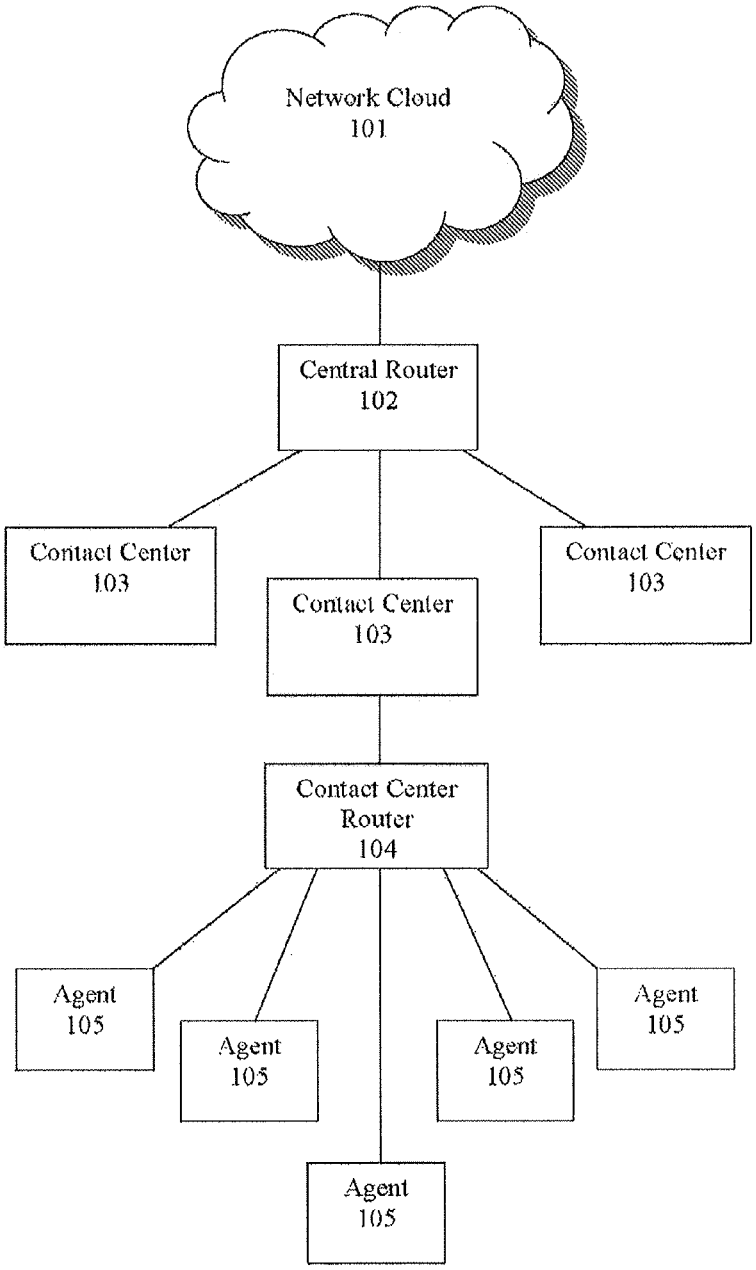
FIG. 1 is a diagram reflecting the general setup of a contact center operation.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

According to one aspect of the present invention, systems, and methods are provided for routing callers to agents within a call center. In one example, a method includes performance based matching (e.g., ranking a set of agents based on performance and preferentially matching callers to the agents based on a performance ranking or score). In a basic example, a performance algorithm includes one or more performance characteristics associated with each agent as input, e.g., an agent's sales or conversion rate, satisfaction rating, cost (e.g., duration of call), and so on. The agent's performance characteristic can also be used in one or more pattern matching algorithms (e.g., comparing agent data, including performance characteristics, associated with a set of agents to caller data associated a set of callers and determine a suitability score of different caller-agent pairs), affinity data matching, and other models for matching callers to agents. The methods may therefore operate to output scores or rankings of the callers, agents, and/or caller-agent pairs for a desired optimization (e.g., for optimizing cost, revenue, customer satisfaction, and so on).

Accurately measuring an agent's performance characteristic(s), however, can be problematic. For instance, in many call routing centers a number of agents may have zero performance, e.g., no conversions or sales, which may occur when an agent first starts and has made few or no calls. This is particularly an issue where the campaign of a call routing center has an intrinsically low sales or Conversion Rate (CR). For instance, if the overall CR of a campaign is low, e.g., 4%, an inexperienced new agent may have to make a large number of calls (e.g., hundreds) before converting a sale (or obtaining some other performance characteristic).

In one example, an exemplary method and system includes identifying agents having a small number of calls, e.g., below a predetermined threshold, and likely a large error in their estimate of an agent performance characteristic, or Agent Performance (AP). In one example, the identified agents are assigned an estimated AP value near or equal to the mean AP for agents across the whole campaign. For example, in the extreme case where an agent has few or no calls, such an agent may be assigned a CR at or near the mean CR of the whole campaign. In other examples, the CR can be assigned at some percentage, e.g., 80% or 90%, of the mean CR of the whole campaign or some other set of agents. As the particular agent makes more calls, the agent's actual CR becomes more reliable (i.e., as they make more calls the error in their estimated AP is reduced), and at a predetermined threshold of calls or error, the system assigns their actual CR value to them. Agents with an intermediate number of calls, e.g., more than zero but less than the predetermined threshold (e.g., sufficient to give a small enough error in their AP) can be assigned an AP between their measured AP and the overall campaign conversion rate. In one example, the system assigns such agents based on a linear interpolation between the agent's measured AP and the overall campaign CR.

Initially, exemplary call routing systems and methods utilizing performance (and/or pattern matching algorithms, either of which may be used within generated computer models for predicting the chances of desired outcomes) are described for routing callers to available agents. This description is followed by exemplary systems and methods for estimating agent performance for use as input into a performance or pattern matching algorithm.

I. Exemplary Systems and Routing Engine

FIG. 1 is a diagram reflecting the general setup of a contact center operation 100. The network cloud 101 reflects a specific or regional telecommunications network designed to receive incoming callers or to support contacts made to outgoing callers. The network cloud 101 can comprise a single contact address, such as a telephone number or email address, or multiple contract addresses. The central router 102 reflects contact routing hardware and software designed to help route contacts among call centers 103. The central router 102 may not be needed where there is only a single contact center deployed. Where multiple contact centers are deployed, more routers may be needed to route contacts to another router for a specific contact center 103. At the contact center level 103, a contact center router 104 will route a contact to an agent 105 with an individual telephone or other telecommunications equipment 105.

Figure 2:
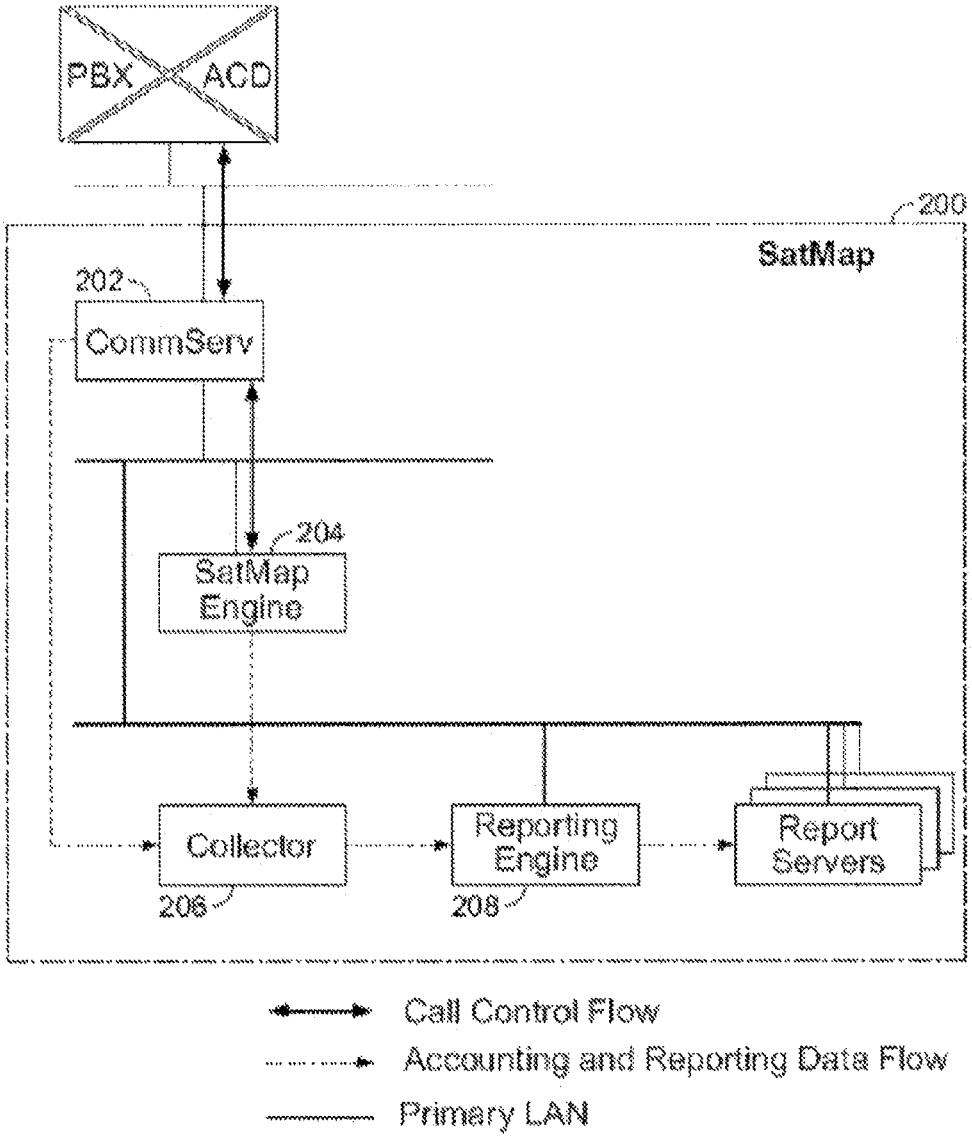
FIG. 2 illustrates an exemplary routing system having a routing engine for routing callers based on performance and/or pattern matching algorithms.

FIG. 2 illustrates an exemplary contact center routing system 200 (which may be included with contact center router 104 of FIG. 1). Broadly speaking, routing system 200 is operable to match callers and agents based, at least in part, on agent performance or pattern matching algorithms using caller data and/or agent data. Routing system 200 may include a communication server 202 and a routing engine 204 (referred to at times as "SatMap" or "Satisfaction Mapping") for receiving and matching callers to agents (referred to at times as "mapping" callers to agents).

Routing engine 204 may operate in various manners to match callers to agents based on performance data of agents, pattern matching algorithms, and computer models, which may adapt over time based on the performance or outcomes of previous caller-agent matches. In one example, the routing engine 204 includes a neural network based adaptive pattern matching engine. Various other exemplary pattern matching and computer model systems and methods which may be included with content routing system and/or routing engine 204 are described, for example, in U.S. Ser. No. 12/021,251, filed Jan. 28, 2008, U.S. Ser. No. 12/202,091, filed Aug. 29, 2008, and U.S. Ser. No. 12/266,461, filed Nov. 6, 2008, all of which are hereby incorporated by reference in their entirety. Of course, it will be recognized that other performance based or pattern matching algorithms and methods may be used alone or in combination with those described here.

Routing system 200 may further include other components such as collector 206 for collecting caller data of incoming callers, data regarding caller-agent pairs, outcomes of caller-agent pairs, agent data of agents, and the like. Further, routing system 200 may include a reporting engine 208 for generating reports of performance and operation of routing system 200. Various other servers, components, and functionality are possible for inclusion with routing system 200. Further, although shown as a single hardware device, it will be appreciated that various components may be located remotely from each other (e.g., communication server 202 and routing engine 204 need not be included with a common hardware/server system or included at a common location). Additionally, various other components and functionality may be included with routing system 200, but have been omitted here for clarity.

Figure 3:
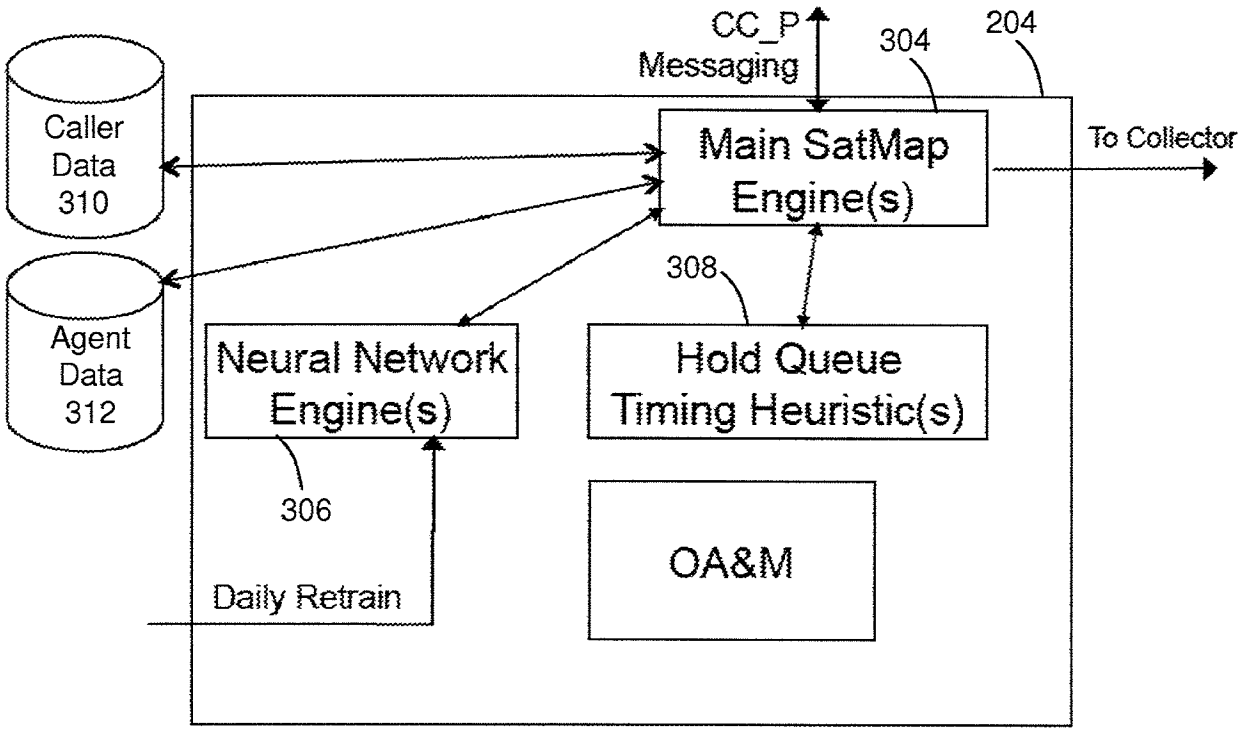
FIG. 3 illustrates an exemplary routing system having a mapping engine for routing callers based on performance and/or pattern matching algorithms.

FIG. 3 illustrates detail of exemplary routing engine 204. Routing engine 204 includes a main mapping engine 304, which receives caller data and agent data from databases 310 and 312. In some examples, routing engine 204 may route callers based solely or in part on performance data associated with agents. In other examples, routing engine 204 may make routing decisions based solely or in part on comparing various caller data and agent data, which may include, e.g., performance based data, demographic data, psychographic data, and other business-relevant data. Additionally, affinity databases (not shown) may be used and such information received by routing engine 204 for making routing decisions.

In one example, routing engine 204 includes or is in communication with one or more neural network engines 306. Neural network engines 306 may receive caller and agent data directly or via routing engine 204 and operate to match and route callers based on pattern matching algorithms and computer models generated to increase the changes of desired outcomes. Further, as indicated in FIG. 3, call history data (including, e.g., caller-agent pair outcomes with respect to cost, revenue, customer satisfaction, etc.) may be used to retrain or modify the neural network engine 306.

Routing engine 204 further includes or is in communication with hold queue 308, which may store or access hold or idle times of callers and agents, and operates to map callers to agents based on queue order of the callers (and/or agents). Mapping engine 304 may operate, for example, to map callers based on a pattern matching algorithm, e.g., as included with neural network engine 306, or based on queue order, e.g., as retrieved from hold queue 308.

II. Exemplary Performance Based and Pattern Matching Processes

Figure 4:
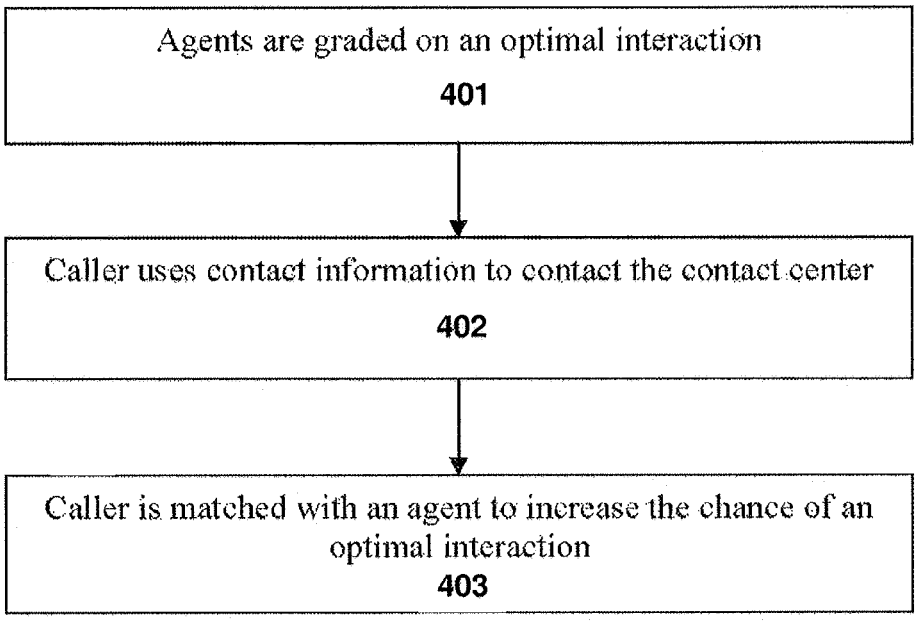
FIG. 4 illustrates an exemplary method or computer model for matching callers to agents based on performance.

FIG. 4 illustrates a flowchart of an exemplary method or model for matching callers to agents based on one or more performance characteristics of agents. The method includes grading at least two agents on an optimal interaction and matching a caller with at least one of the two graded agents to increase the chance of the optimal interaction, e.g., matching a caller to the agent having the better performance. At the initial block 401, agents are graded on an optimal interaction, such as increasing revenue, decreasing costs, or increasing customer satisfaction. Grading can be accomplished by collating the performance of a contact center agent over a period of time on their ability to achieve an optimal interaction, such as a period of at least 10 days. However, the period of time can be as short as the immediately prior contact to a period extending as long as the agent's first interaction with a caller. Moreover, the method of grading agent can be as simple as ranking each agent on a scale of 1 to N for a particular optimal interaction, with N being the total number of agents. The method of grading can also comprise determining the average contact handle time of each agent to grade the agents on cost, determining the total or average sales revenue or number of sales generated by each agent to grade the agents on sales, or conducting customer surveys at the end of contacts with callers to grade the agents on customer satisfaction. The foregoing, however, are only examples of how agents may be graded; many other methods may be used.

At block 402 a caller uses contact information, such as a telephone number or email address, to initiate a contact with the contact center. At block 403, the caller is matched with an agent or group of agents such that the chance of an optimal interaction is increased, as opposed to a simple round robin matching method, for example. For instance, in a basic performance matching algorithm, an incoming caller is routed to the available agent having the highest sales rate.

The method may further include grading a group of at least two agents on two optimal interactions, weighting one optimal interaction against another optional interaction, and matching the caller with one of the two graded agents to increase the chance of a more heavily-weighted optimal interaction. In particular, agents may be graded on two or more optimal interactions, such as increasing revenue, decreasing costs, or increasing customer satisfaction, which may then be weighted against each other. The weighting can be as simple as assigning to each optimal interaction a percentage weight factor, with all such factors totaling to 100 percent. Any comparative weighting method can be used, however. The weightings placed on the various optimal interactions can take place in real-time in a manner controlled by the contact center, its clients, or in line with pre-determined rules.

Figure 5:
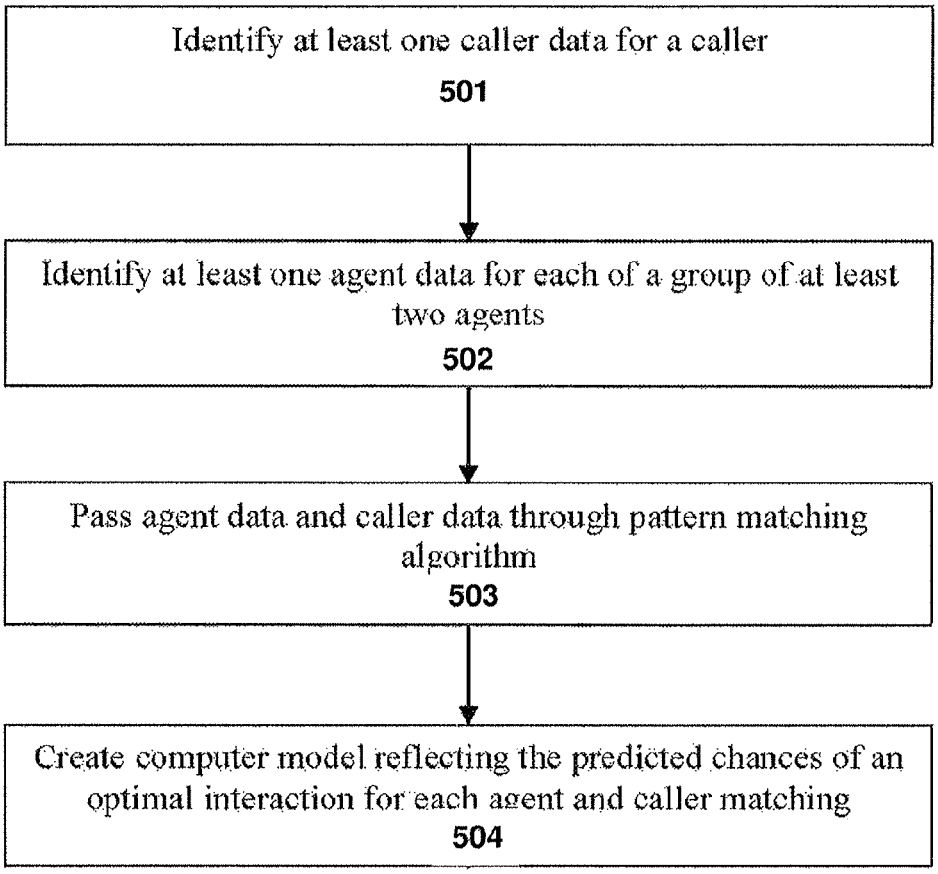
FIG. 5 illustrates an exemplary method or computer model for matching callers to agents based on caller data and agent data.

FIG. 5 illustrate another exemplary model or method for matching a caller to an agent, and which may combine agent performance characteristics or grades, agent demographic data, agent psychographic data, and other business-relevant data about the agent (individually or collectively referred to in this application as "agent data"), along with demographic, psychographic, and other business-relevant data about callers (individually or collectively referred to in this application as "caller data"). Agent and caller demographic data can comprise any of: gender, race, age, education, accent, income, nationality, ethnicity, area code, zip code, marital status, job status, and credit score. Agent and caller psychographic data can comprise any of introversion, sociability, desire for financial success, and film and television preferences. It will be appreciated that the acts outlined in the flowchart of FIG. 5 need not occur in that exact order.

This exemplary model or method includes determining at least one caller data for a caller, determining at least one agent data for each of two agents, using the agent data and the caller data in a pattern matching algorithm, and matching the caller to one of the two agents to increase the chance of an optimal interaction. At 501, at least one caller data (such as a caller demographic or psychographic data) is determined. One way of accomplishing this is by retrieving this from available databases by using the caller's contact information as an index. Available databases include, but are not limited to, those that are publicly available, those that are commercially available, or those created by a contact center or a contact center client. In an outbound contact center environment, the caller's contact information is known beforehand. In an inbound contact center environment, the caller's contact information can be retrieved by examining the caller's CallerID information or by requesting this information of the caller at the outset of the contact, such as through entry of a caller account number or other caller-identifying information. Other business-relevant data such as historic purchase behavior, current level of satisfaction as a customer, or volunteered level of interest in a product may also be retrieved from available databases.

At 502, at least one agent data for each of two agents is determined, which may include performance characteristic data as well as demographic or psychographic data. One method of determining agent demographic or psychographic data can involve surveying agents at the time of their employment or periodically throughout their employment. Such a survey process can be manual, such as through a paper or oral survey, or automated with the survey being conducted over a computer system, such as by deployment over a web-browser.

Though this advanced embodiment preferably uses agent performance characteristics or grades, demographic, psychographic, and other business-relevant data, along with caller demographic, psychographic, and other business-relevant data, other embodiments of the present invention can eliminate one or more types or categories of caller or agent data to minimize the computing power or storage necessary to employ the present invention.

Once agent data and caller data have been collected, this data is passed to a computational system. The computational system then, in turn, uses this data in a pattern matching algorithm at 503 to create a computer model that matches each agent with the caller and estimates the probable outcome of each matching along a number of optimal interactions, such as the generation of a sale, the duration of contact, or the likelihood of generating an interaction that a customer finds satisfying.

The pattern matching algorithm to be used in the present invention can comprise any correlation algorithm, such as a neural network algorithm or a genetic algorithm. To generally train or otherwise refine the algorithm, actual contact results (as measured for an optimal interaction) are compared against the actual agent and caller data for each contact that occurred. The pattern matching algorithm can then learn, or improve its learning of, how matching certain callers with certain agents will change the chance of an optimal interaction. In this manner, the pattern matching algorithm can then be used to predict the chance of an optimal interaction in the context of matching a caller with a particular set of caller data, with an agent of a particular set of agent data. Preferably, the pattern matching algorithm is periodically refined as more actual data on caller interactions becomes available to it, such as periodically training the algorithm every night after a contact center has finished operating for the day.

At 504, the pattern matching algorithm is used to create a computer model reflecting the predicted chances of an optimal interaction for each agent and caller matching. Preferably, the computer model will comprise the predicted chances for a set of optimal interactions for every agent that is logged in to the contact center as matched against every available caller. Alternatively, the computer model can comprise subsets of these, or sets containing the aforementioned sets. For example, instead of matching every agent logged into the contact center with every available caller, the example can match every available agent with every available caller, or even a narrower subset of agents or callers. Likewise, the exemplary method can match every agent that ever worked on a particular campaign—whether available or logged in or not—with every available caller. Similarly, the computer model can comprise predicted chances for one optimal interaction or a number of optimal interactions.

The computer model can also be further refined to comprise a suitability score for each matching of an agent and a caller. The suitability score can be determined by taking the chances of a set of optimal interactions as predicted by the pattern matching algorithm, and weighting those chances to place more or less emphasis on a particular optimal interaction as related to another optimal interaction. The suitability score can then be used to determine which agents should be connected to which callers.

III. Exemplary Agent Performance Estimation/Assigning Processes

Figure 6:
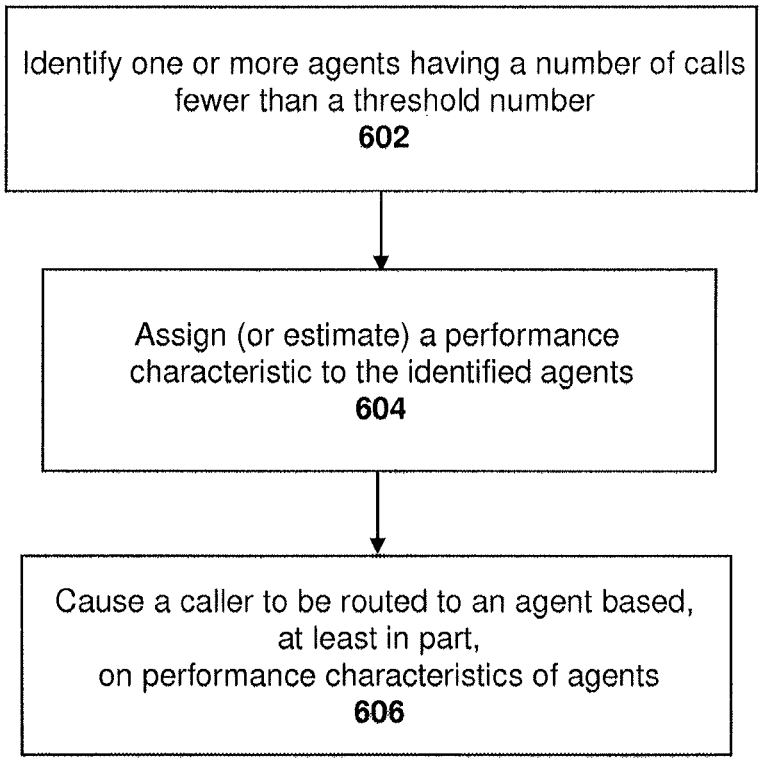
FIG. 6 illustrates an exemplary method or computer model for estimating a performance characteristic of an agent.

According to one example, exemplary processes for estimating an agent's performance are provided, which may be used with a performance based matching or pattern matching processes. FIG. 6 illustrates an exemplary computer implemented method or process for estimating a performance characteristic for an agent. In this example, one or more agents of a plurality of agents are identified as having a number of calls fewer than a predefined threshold at 602. The threshold number of calls may be determined in a variety of manners, including, for example, selecting a number based on a desired error rate, a percentage of the average number of calls per agent, number of converted calls, and so on.

The process then assigns a performance characteristic to the identified agents at 604. The assigned performance characteristic may be an average for all agents in a call routing center or campaign. The assigned performance characteristic may further be some fraction lower or higher than an average, e.g., setting a conversion rate at 80% or 90% of the average conversion rate of a set of agents or for the particular campaign. Further, the assigned performance characteristic may include an adjustment to the particular agent's actual performance characteristic, e.g., adjusting an actual performance characteristic up or down toward an average performance characteristic for other agents.

The process further includes, at 606, matching or routing a caller to an agent of a plurality of agents based, at least in part, on the performance characteristics of the agents, including the assigned performance characteristic(s) of those identified agents and actual performance characteristics of other agents. For example, in a simple performance based routing example, an incoming caller can be routed to the available agent having the highest (or most desired by the routing center) performance characteristic, whether estimated or actual. In other examples, the assigned performance characteristics are used as input into performance and/or pattern matching algorithms for routing callers to agents.

Figure 7:
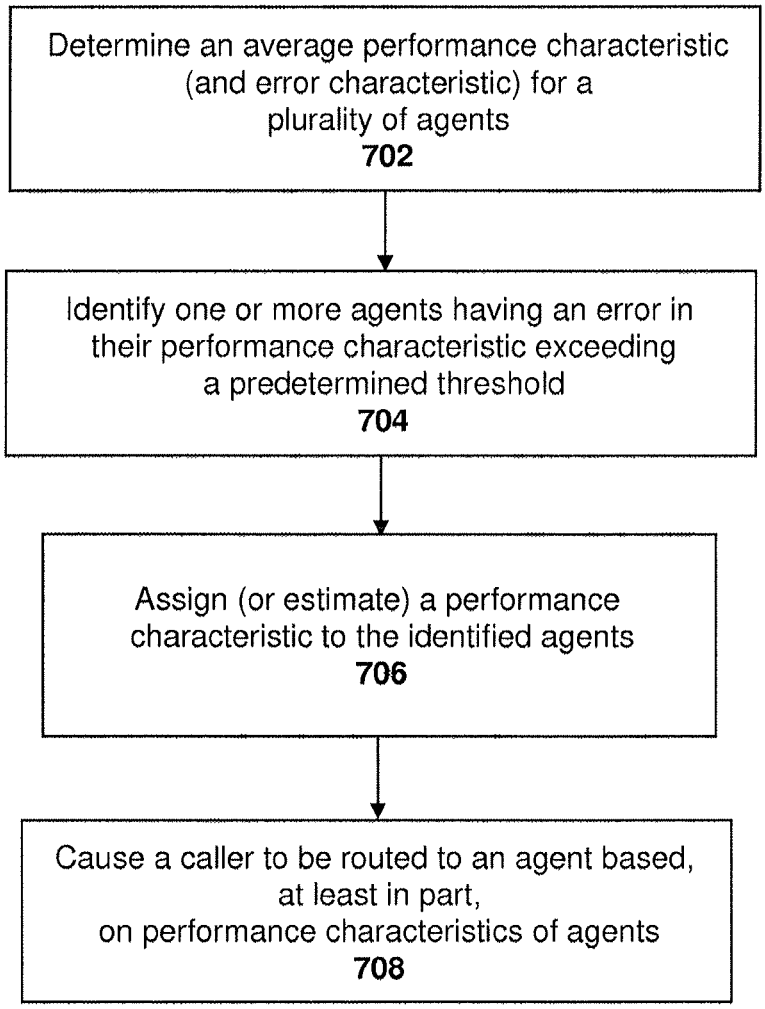
FIG. 7 illustrates another exemplary method or computer model for estimating a performance characteristic of an agent.

FIG. 7 illustrates another exemplary method or computer model for estimating an agent performance characteristic for use in routing callers to agents. This example includes determining errors in a particular performance characteristic and assigning agent performance characteristics based thereon. Initially, agent performance, p, of an agent who has made n calls resulting in h sales is given by:

$$p = \frac{h}{n} \tag{1}$$

and the standard error, σ, of this estimate of p can be found from:

$$\sigma = \sqrt{\frac{p(1-\rho)}{n}} \tag{2}$$

The fractional error, e, of the estimate of p can be defined as:

$$e = \frac{\sigma}{p} \tag{3}$$

In one example, when the error becomes larger than a predefined threshold, t, the exemplary method and system provides an estimate of the agent's performance, different than provided by p. In one example, the system and method provides an estimate of (or adjusts) the agent's performance characteristic when the error equals or exceeds the threshold:

$$e = \frac{\sigma}{p} = t \tag{4}$$

The number of calls an agent would have had to make to just meet the error threshold of t can be determined. For example, the number of calls to just meet the threshold indicated by N, and substituting (2) into (4) to eliminate σ:

$$\frac{1}{p}\sqrt{\frac{p(1-p)}{N}} = t \tag{5}$$

which is equivalent to:

$$N = \frac{1-p}{pt^2} \tag{6}$$

Accordingly, if an agent has N (or more) calls the exemplary system will use the agents actual performance characteristic, e.g., as calculated in (1) above. If an agent has zero calls, the exemplary system and method assign the agent an average performance characteristic, e.g., the overall conversion rate across all agents, as a best estimate for his/her performance. In particular, and in one example, let the overall conversion rate R defined as:

$$R = \frac{\text{Total number of sales across all agents}}{\text{Total number of calls across all agents}} \tag{7}$$

In some examples, rather than computing N from equation 6 above, a fixed N can be selected or set within the system, which may be based on the average conversion rate of the call center. For example, in a high CR environment (e.g., where 50% of calls result in a sale) N might be set to a small number, e.g., between 10 and 100. Whereas in a low CR system (e.g., where approximately 1% of calls results in a sale), N can be set higher, e.g., 200 or more.

In some examples, R can be defined to regress towards CR when agents do not have enough data, R, as the CR averaged across the whole call center. But it might be the case that new agents will in general perform less well than the call center average because they are inexperienced. Therefore, in one example, R can be set to a lower value than the call centre average, e.g., R=(overall conversion rate)/2, or some other lower number.

In one example, assigning an adjusted agent performance, $p_{adj}$, for agents whose number of calls taken falls in the range 0<n<N, the exemplary method assumes that as the number of calls approaches zero, the overall conversion rate is used, and as the number of calls approaches the threshold number N, the agent's own performance is used; in particular:

$$\lim_{n\to 0} p_{adj} = R \;\&\; \lim_{n\to N} p_{adj} = p \tag{8}$$

The exemplary method and system may interpolate between these two points, e.g., linearly interpolate between the two points. It will be recognized, of course, that other functions, e.g., a monotonic function, could also be used. In one example:

$$p_{adj} = mn + c \tag{9}$$

Using equation (9), and taking point 1 as the n=0 case, as point 2 as n=N, gives:

$$R = m\times 0 + c \text{ (Point1)}$$

$$p = m\times N + c \text{ (Point2)} \tag{10}$$

From which it follows that:

$$m = \frac{p-R}{N} \tag{11}$$

$$c = R$$

Therefore the calculation of adjusted agent performance, $p_{adj}$, for an agent with n calls, where 0<n<N, can be determined as follows:

$$p_{adj} = \frac{p-R}{N}n + R \tag{12}$$

With continued reference to FIG. 7, in one exemplary process, an average characteristic is determined for a plurality of agents at 702. For example, with the illustrated example described here, R from equation (7) is computed. Further, agents are identified having an error, e.g., a fractional error, exceeding a predetermined threshold value at 704. The agents may be identified by computing equations (1), (2), and (3), for example.

If the error exceeds the threshold, e.g., if e>t, a performance characteristic may be assigned to the identified agents at 706. For example, N may be determined from equation (6) and used to determine an adjusted agent performance, $p_{adj}$, from (12). It is noted that equation 12 provides an adjustment to an actual performance characteristic of the agent, the adjustment based on a liner interpolation between two points. In other examples, however, other interpolations may be used for adjusting/assigning a performance characteristic. Additionally, a substitution of a value unrelated to the agent's actual performance characteristic may be used, e.g., the average rate or some fraction of the average rate.

The final selection or mapping of a caller to an agent based on actual and assigned performance characteristics may then be passed to a routing engine or router for causing the caller to be routed to the agent at 708. It is noted that the described actions of the exemplary methods described do not need to occur in the order in which they are stated and some acts may be performed in parallel. Further, additional matching models for scoring and mapping callers to agents may be used in a similar fashion, and a plurality of matching algorithms may be used and weighted against each other for determining a final selection of a caller-agent pair.

Determining a threshold number of calls or error value in practice may be evaluated and selected in many different manners For example, typically, one would like to set t such that the performance of a routing system is optimized. For example, using a small threshold may increase performance, however, if an unnecessarily small value is used, the system will needlessly reduce performance accuracy for agents who have a total number of calls <N and whose performance is far from the mean.

Figure 8A:
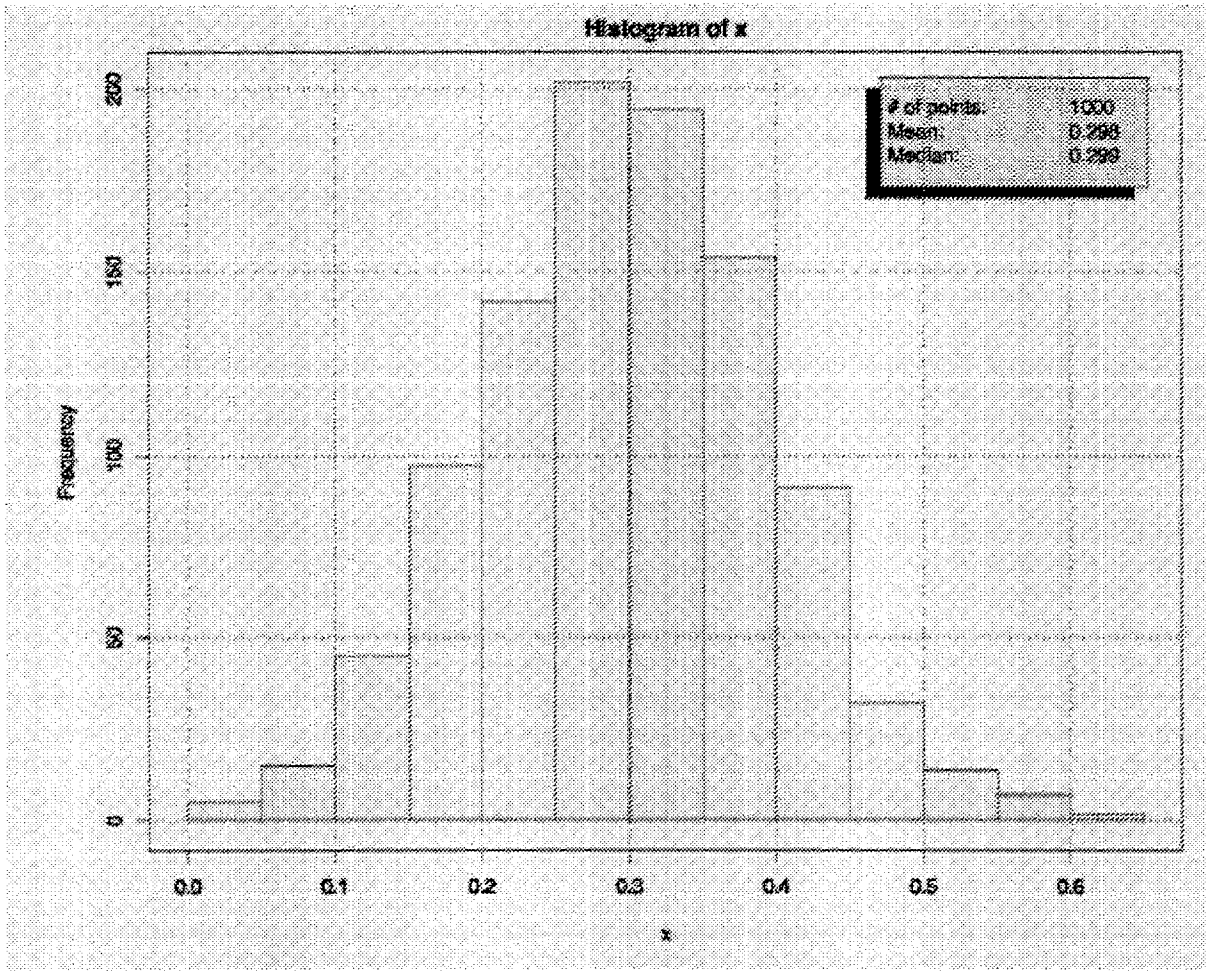
FIGS. 8A-8E illustrate graphs for an exemplary Monte Carlo simulation for selecting a desired threshold for assigning performance characteristics.

One manner for determining the effect of and selecting (or changing) a threshold value is with a Monte Carlo simulation. FIGS. 8A-8E illustrate graphs for an exemplary method and Monte Carlo simulation for selecting a desired threshold for estimating agent performance characteristics. In one example, an overall distribution of agent performance is chosen, which can be viewed as the true agent performances, i.e., with no error, as would be found for an infinite sample of calls for each agent. FIG. 8A illustrates an exemplary near normal distribution of 1000 agents with mean AP=0.3 and SD=0.1 in a Monte Carlo simulation (note that the handful of negative performances were set to zero).

For a given number of free agents (shown from the set {2, 5, 10, 20, 40}) and for a given value of t (shown from the set t=0, 0.1, 0.2, . . . , 1) free agents are selected randomly from the above distribution. The agent having the maximum true AP of the set of free agents is determined, and is therefore the correct agent for an exemplary performance based matching algorithm to select.

Next, each of the true agent performances is dithered (i.e., noise or error is intentionally added) to simulate the actually measured agent performances with an error due to the finite sample. For example, the dithering is applied by adding an error term to each agent's AP of N(0, 1):

$$p_{Dithered}=p_{True}(1+tN(0,1)) \tag{13}$$

where $p_{True}$ is the true agent performance, and $N(\mu, \sigma)$ is the normal distribution.

Figure 8B:
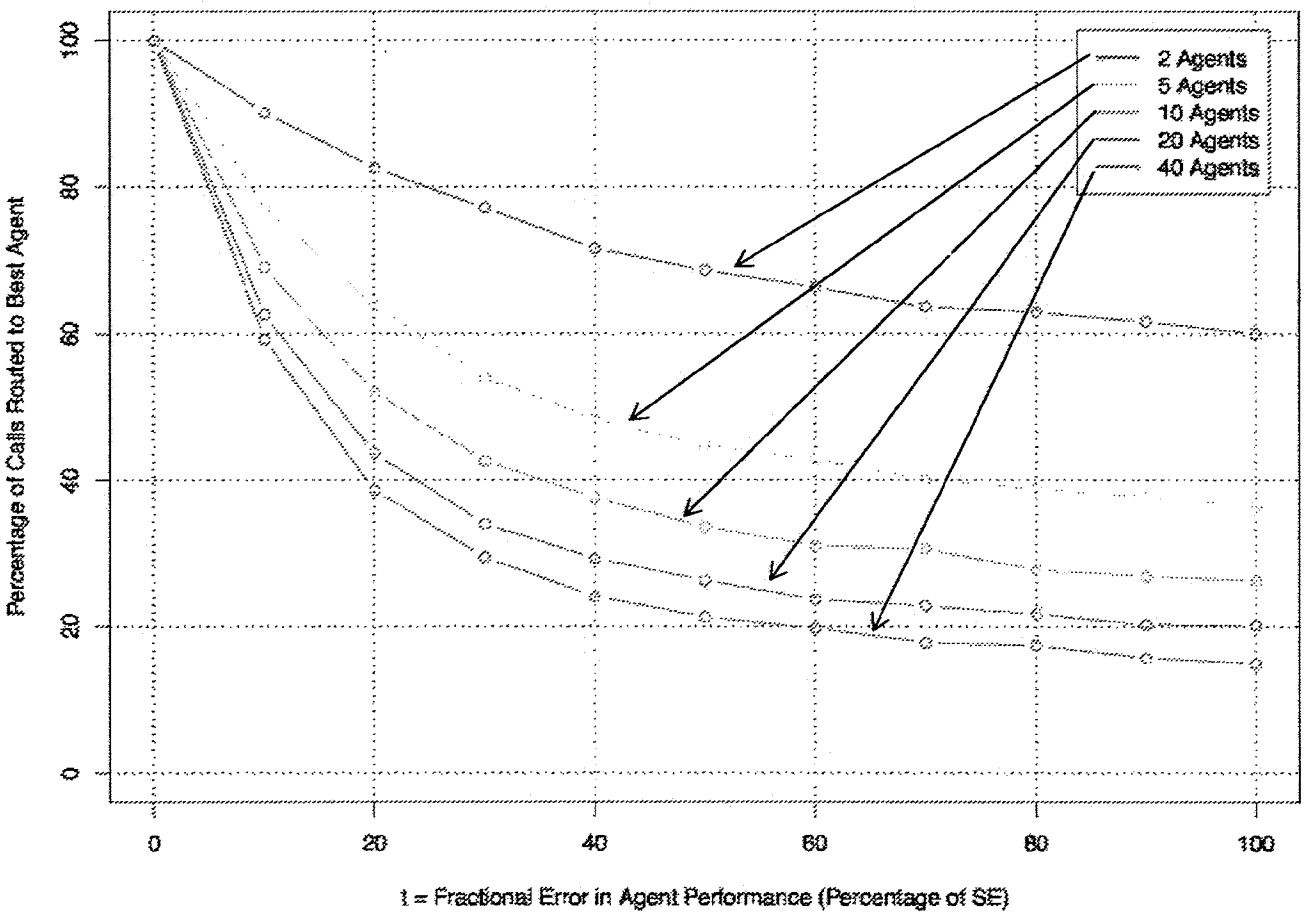

From this, one can check that the actually selected agent (i.e., one with maximum dithered agent performance) is the same as the one chosen in step (3), and if not, record the error in performance of the selected agent that occurred. This process can be repeated (e.g., 1,000 or more times) for each combination of number of free agents (e.g., 2, 5, 10, 20, and 40) and value of t. FIG. 8B illustrates the Monte Carlo results for this example; in particular, illustrating the percentage of calls routed to the agent with maximum true AP of the available agents versus t. As one would expect with at of zero, the correct (i.e., highest performing) agent is always chosen and the fraction of correct agents selection declines as t increases. Also, the loss of selection accuracy increases with the number of free agents available.

Figure 8C:
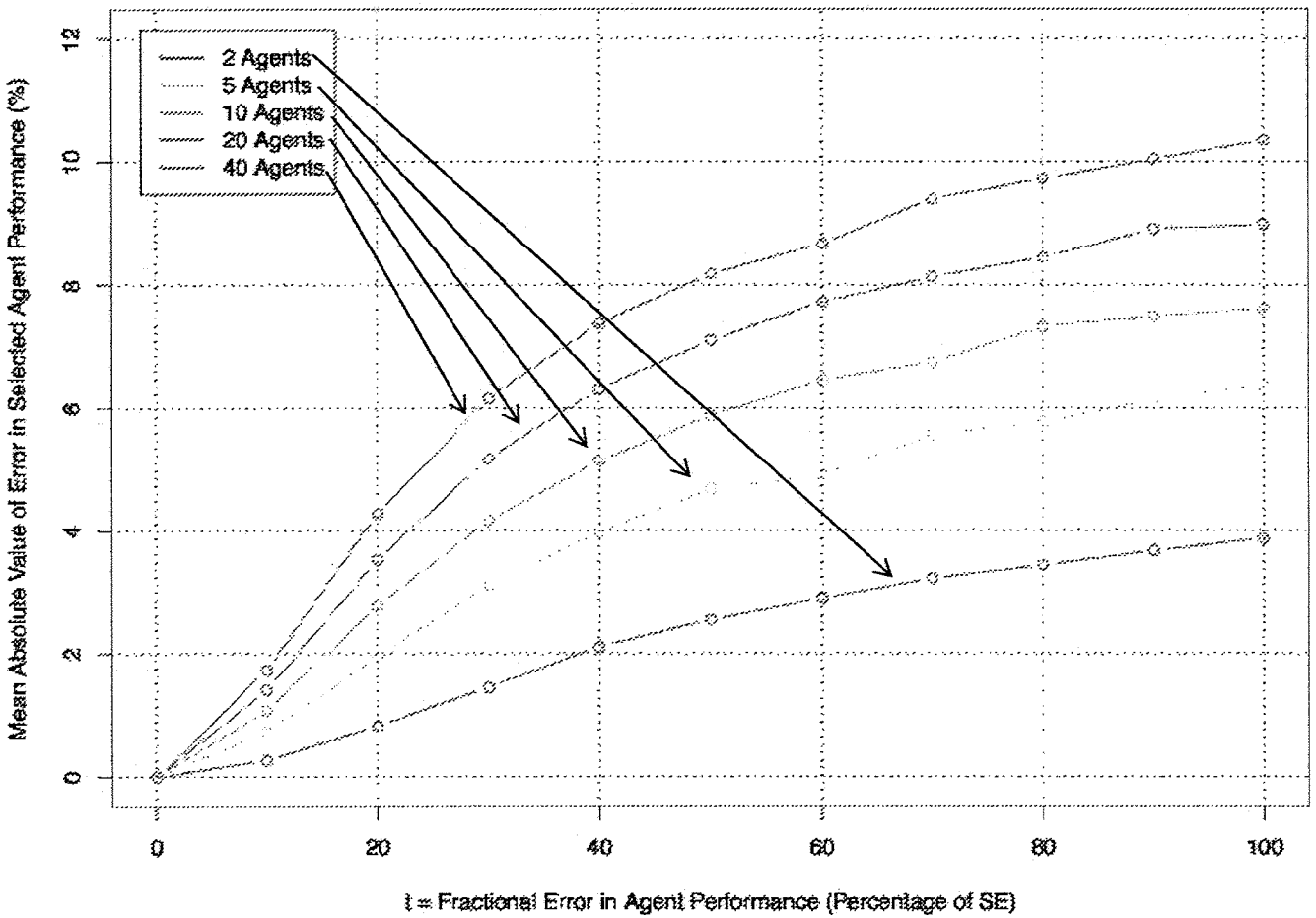

Another metric one can consider in determining a threshold value is the absolute value of the difference between the true agent performance of the actually selected agent (based on the noisy AP values) and the true agent performance of the agent that would have been selected (had the selection been based on true agent performances). FIG. 8C illustrates absolute value of error in performance of selected agent versus t (where the number of agents increases the mean absolute value of error for a given fraction error in agent performance, as shown).

Figure 8D:
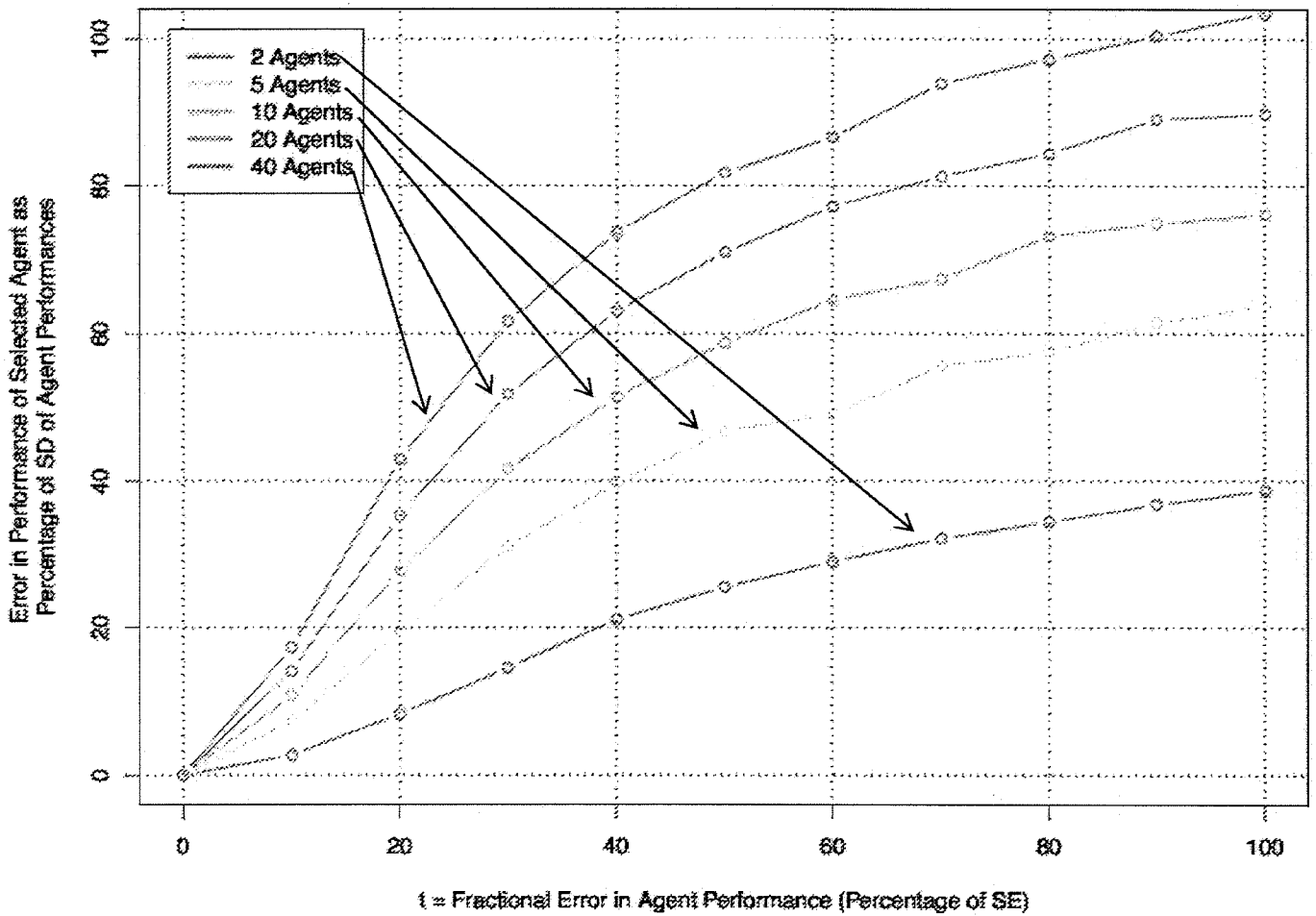

Additionally, since the range of agent performances available varies between different mapping implementations, another metric includes expressing the error as a fraction of the standard deviation of the agent performance. FIG. 8D illustrates the error of AP of a selected agent measured in standard deviations of AP versus t. As illustrated, as the number of agents increases, the error in performance increases for a given t.

Accordingly, a contact center routing operator may analyze various different metrics in selecting a suitable or tolerable t, and which may further be varied depending on the number of agents, expected available agents, distribution of performance, and so on. Further, other estimation and simulation techniques may be used to assist an operator in setting thresholds.

Figure 8E:
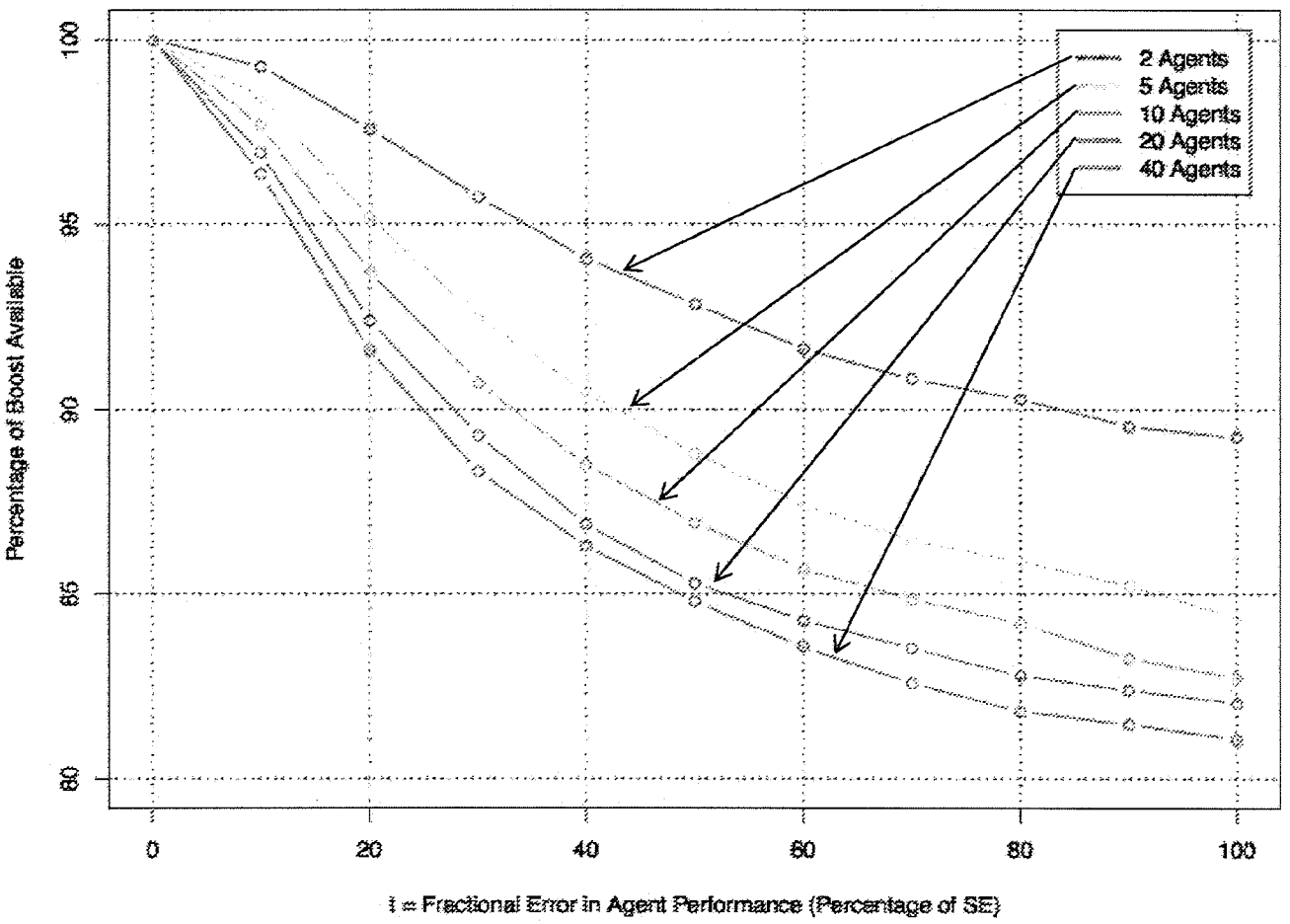

FIG. 8E illustrates an exemplary impact on the increase (or boost) of a performance based matching process from the Monte Carlo simulation data; in particular, the fraction of boost lost versus t. If one assumes that boost is proportional to the average agent performances of the selected agents, one can compare the true AP's of the agents selected with the AP's of those which would have been selected had the true AP's been known, and thus calculate a fractional decrease in the boost. With this assumption it follows:

$$\text{Decrease of Boost} \propto \frac{\text{Mean True AP of Agents Selected from Dithered Data}}{\text{Mean True AP of Agents Selected from True Data}} \tag{14}$$

It is noted that FIG. 8E, and the decrease in boost model, is deficient in that it assumes the same level of noise or error for all agents, whereas in a real call center there will be a range of imprecision depending on the accumulated number of calls for each agent. Accordingly, the model and calculations could easily be improved upon by including either an empirical or theoretical distribution of total calls per agent.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 9:
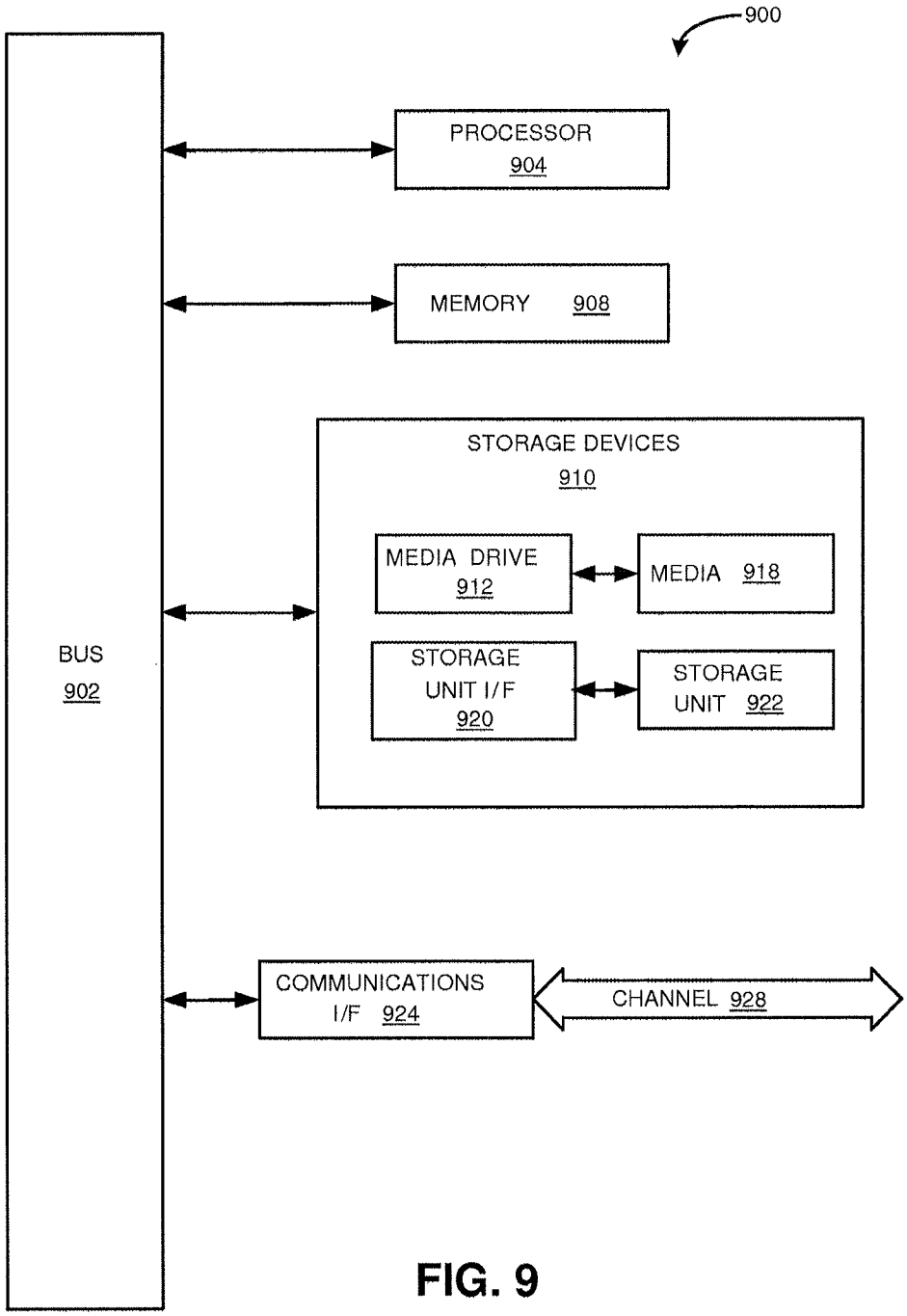
FIG. 9 illustrates a typical computing system that may be employed to implement some or all processing functionality in certain embodiments of the invention.

FIG. 9 illustrates a typical computing system 900 that may be employed to implement processing functionality in embodiments of the invention. Computing systems of this type may be used in clients and servers, for example. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special purpose processing engine such as, for example, a microprocessor, microcontroller or other control logic. In this example, processor 904 is connected to a bus 902 or other communication medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory ("ROM") or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 918 may include, for example, a hard disk, floppy disk, magnetic tape, optical disk, CD or DVD, or other fixed or removable medium that is read by and written to by media drive 912. As these examples illustrate, the storage media 918 may include a computer-readable storage medium having stored therein particular computer software or data.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals which can be electronic, electromagnetic, optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to physical, tangible media such as, for example, memory 908, storage media 918, or storage unit 922. These and other forms of computer-readable media may be involved in storing one or more instructions for use by processor 904, to cause the processor to perform specified operations. Such instructions, generally referred to as "computer program code" (which may be grouped in the form of computer programs or other groupings), when executed, enable the computing system 900 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage media 918, drive 912 or communications interface 924. The control logic (in this example, software instructions or computer program code), when executed by the processor 904, causes the processor 904 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The above-described embodiments of the present invention are merely meant to be illustrative and not limiting. Various changes and modifications may be made without departing from the invention in its broader aspects. The appended claims encompass such changes and modifications within the spirit and scope of the invention.

We claim:

[1. A computer implemented method for estimating agent performance in a call-center routing environment, the method comprising:

identifying, by one or more computers, one agent from a plurality of agents, wherein the one agent identified has a number of calls fewer than a predetermined number;

computing and assigning, by the one or more computers, a respective assigned outcome performance characteristic to the one identified agent, wherein the assigned outcome performance is different from an actual outcome performance characteristic for the identified agent, and is based at least in part on the performance of one or more other of the agents; and routing, by the one or more computers, a caller to an agent of the plurality of agents based on respective outcome performance characteristics of the plurality of agents, the outcome performance characteristics including the assigned outcome performance characteristic to the one identified agent.]

[2. The method of claim 1, wherein the assigned outcome performance characteristic is an average outcome performance characteristic of the plurality of agents.]

[3. The method of claim 1, wherein the assigned outcome performance characteristic is based at least in part on an average outcome performance characteristic of the plurality of agents.]

[4. The method of claim 1, wherein the assigned outcome performance characteristic for the one identified agent is based at least in part on agent outcome performance data of one or more agents having similar demographic data as the respective agent.]

[5. The method of claim 1, wherein the computing and assigning step comprises computing, by the one or more computers, an adjustment to an actual outcome performance characteristic of the one identified agent based on one or more criteria.]

[6. The method of claim 1, wherein the computing step comprises determining an interpolation between an actual outcome performance characteristic value of the one identified agent and an outcome performance characteristic of the plurality of agents based at least in part on the criterion of a number of calls received by the one identified agent.]

[7. The method of claim 1, wherein the predetermined number of calls is determined relative to an average number of calls for the plurality of agents.]

[8. The method of claim 1, wherein the predetermined number of calls is associated with an error threshold in the outcome performance characteristic of the agents.]

[9. The method of claim 1, wherein the agent outcome performance characteristic comprises a sales rate.]

[10. The method of claim 1, wherein routing the caller is based on an outcome performance based matching algorithm.]

[11. The method of claim 1, wherein routing the caller is based on a pattern matching algorithm, and the assigned agent outcome performance characteristic is input into the pattern matching algorithm.]

[12. A computer implemented method for estimating agent outcome performance in a call-center routing environment, the method comprising:

determining, by one or more computers, respective actual outcome performance characteristics for each of a plurality of agents;

determining, by the one or more computers, an outcome performance characteristic representative of the plurality of agents;

identifying, by the one or more computers, a respective one of the agents having an error in the respective agent's outcome performance characteristic greater than a predetermined threshold;

assigning, by the one or more computers, an outcome performance characteristic for the identified agent which assigned outcome performance is different from the actual outcome performance characteristic for the one identified agent and which is based at least in part on the representative outcome performance characteristic for the plurality of agents; and routing, by the one or more computers, a caller to one of the plurality of agents based on the outcome performance characteristics, the outcome performance characteristics including the assigned outcome performance characteristic to the identified agent.]

[13. The method of claim 12, wherein the error comprises a fractional error.]

[14. The method of claim 12, wherein the assigned outcome performance characteristic is an average outcome performance characteristic of the plurality of agents.]

[15. The method of claim 12, wherein the assigned outcome performance characteristic is based at least in part on an average outcome performance characteristic of the plurality of agents.]

[16. The method of claim 12, wherein the assigning step comprises computing, by the one or more computers, an adjustment to an actual outcome performance characteristic of the identified agent.]

[17. The method of claim 16, wherein the computing step comprises determining an interpolation between an actual outcome performance characteristic value of the respective identified agent and an average outcome performance characteristic of the plurality of agents.]

[18. The method of claim 12, wherein the predetermined threshold is based on a fractional error of the outcome performance characteristic.]

[19. The method of claim 12, wherein the agent outcome performance characteristic comprises a sales rate.]

[20. The method of claim 12, wherein routing the caller is based on an outcome performance based matching algorithm.]

[21. The method of claim 12, wherein routing the caller is based on a pattern matching algorithm, and the assigned agent outcome performance characteristic is input into the pattern matching algorithm.]

[22. A system for routing callers to agents in a call center routing environment, the system comprising:

one or more computers configured with computer-readable program code, that when executed, will cause performance of the steps:

identifying, by the one or more computers, one agent from a plurality of agents, wherein the one agent identified has a number of calls fewer than a predetermined number;

computing and assigning, by the one or more computers, a respective outcome performance characteristic to the one identified agent, wherein the assigned outcome performance is different from an actual outcome performance characteristic for the respective identified agent, and is based at least in part on the performance of one or more other of the agents; and routing, by the one or more computers, a caller to an agent of the plurality of agents based on respective outcome performance characteristics of the plurality of agents, the outcome performance characteristics including the assigned outcome performance characteristic to the one identified agent.]

[23. A system for routing callers to agents in a call center routing environment, the system comprising:

one or more computers configured with computer-readable program code, that when executed, will cause performance of the steps:

determining, by the one or more computers, respective actual outcome performance characteristics for a plurality of agents;

determining, by the one or more computers, an outcome performance characteristic representative of the plurality of agents;

identifying, by the one or more computers, a respective one of the agents having an error in the respective agent's outcome performance characteristic greater than a predetermined threshold;

assigning, by the one or more computers, an outcome performance characteristic for the identified agent which assigned outcome performance is different from the actual outcome performance characteristic for the one identified agent and which is based at least in part on the representative outcome performance characteristic for the plurality of agents; and routing, by the one or more computers, a caller to one of the plurality of agents based on the outcome performance characteristics, the outcome performance characteristics including the assigned outcome performance characteristic to the identified agent.]

[24. A non-transitory computer readable storage medium comprising computer readable instructions for carrying out, when executed by one or more computers, the method:

identifying, by the one or more computers, one agent from a plurality of agents, wherein the one agent identified has a number of calls fewer than a predetermined number;

computing and assigning, by the one or more computers, a respective assigned outcome performance characteristic to the one identified agent, wherein the assigned outcome performance is different from an actual outcome performance characteristic for the identified agent, and is based at least in part on the performance of one or inure other of the agents; and routing, by the one or more computers, a caller to an agent of the plurality of agents based on respective outcome performance characteristics of the plurality of agents, the outcome performance characteristics including the assigned outcome performance characteristic to the one identified agent.]

[25. A non-transitory computer readable storage medium comprising computer readable instructions for carrying out, when executed by one or more computers, the method:

determining, by the one or more computers, respective actual outcome performance characteristics for a plurality of agents;

determining, by the one or more computers, an outcome performance characteristic representative of the plurality of agents;

identifying, by the one or more computers, a respective one of the agents having an error in the respective agent's outcome performance characteristic greater than a predetermined threshold;

assigning, by the one or more computers, an outcome performance characteristic for the identified agent which assigned outcome performance is different from the actual outcome performance characteristic for the one identified agent and which is based at least in part on the representative outcome performance characteristic for the plurality of agents; and routing, by the one or more computers, a caller to one of the plurality of agents based on the outcome performance characteristics, the outcome performance characteristics including the assigned outcome performance characteristic to the identified agent.]

[26. The method of claim 1, wherein the predetermined number of calls is determined based at least in part on a conversion rate for the plurality of the agents.]

[27. The method of claim 1, further comprising:

computing, by the one or more computers, a boost of performance based at least in part on a representative number for agent outcome performances of the agents that were selected and based at least in part on the representative number for the agent outcome performances of the agents that would have been selected based on their actual agent performances.]

[28. The system of claim 22, wherein the predetermined number of calls is determined based at least in part on a conversion rate for the plurality of the agents.]

[29. The system of claim 22, where the one or more computers are further configured with computer-readable program code, that when executed, will cause performance of the step:

computing, by the one or more computers, a boost of performance based at least in part on a representative number for agent outcome performances of the agents that were selected and based at least in part on the representative number for the agent outcome performances of the agents that would have been selected based on their actual agent performances.]

[30. The system of claim 22, wherein the assigned outcome performance characteristic for the one identified agent is based at least in part on agent outcome performance data of one or more agents having similar demographic data as the respective agent.]

[31. The system of claim 22, wherein the assigned outcome performance characteristic is based at least in part on an average outcome performance characteristic of the plurality of agents.]

[32. The system of claim 22, wherein the computing and assigning step comprises computing, by the one or more computers, an adjustment to an actual outcome performance characteristic of the one identified agent based on one or more criteria.]

[33. The system of claim 32, wherein the computing step comprises determining an interpolation between an actual outcome performance characteristic value of the one identified agent and an outcome performance characteristic of the plurality of agents based at least in part on the criterion of a number of calls received by the one identified agent.]

*34. A method for pairing contacts and agents in a contact center system comprising:*

*determining, by at least one computer processor configured to perform contact/agent pairing operations in the contact center system, a measured performance rating of a first agent of a plurality of agents;*

*assigning, by the at least one computer processor, an adjusted performance rating to the first agent when a calculated error in the measured performance rating exceeds a threshold, wherein the adjusted performance rating is different from the measured performance rating and is based at least in part on regression toward a mean performance measurement of one or more other of the plurality of agents;*

*pairing, by the at least one computer processor, a contact with the first agent of the plurality of agents based on the adjusted performance rating of the first agent; and*

*establishing, by the at least one computer processor, a connection between the paired contact and first agent in the contact center system based on the adjusted performance rating of the first agent.*

*35. The method of claim 34, wherein the adjusted performance rating is greater than the measured performance rating.*

*36. The method of claim 34, wherein the adjusted performance rating is a baseline performance rating or an interpolation between the baseline performance rating and the measured performance rating.*

*37. The method of claim 36, wherein the baseline performance rating is a mean performance rating across the plurality of agents.*

*38. The method of claim 36, wherein the baseline performance rating is a below-mean performance rating across the plurality of agents.*

*39. The method of claim 36, wherein a number of contact interactions of the first agent is less than a first threshold*

*number of contact interactions, and wherein the adjusted performance rating comprises the baseline performance rating.*

*40. The method of claim 36, wherein a number of contact interactions of the first agent is between a first threshold number of contact interactions and a second threshold number of contact interactions, and wherein the adjusted performance rating is between the baseline performance rating and the measured performance rating.*

*41. The method of claim 40, wherein the second threshold number of contact interactions comprises an average number of contact interactions across the plurality of agents.*

*42. The method of claim 34, wherein the first agent is a new agent, and wherein the adjusted performance rating comprises the mean performance rating across the plurality of agents.*

*43. A system for pairing contacts and agents in a contact center system comprising:*

*a routing engine configured to perform contact/agent pairing operations in the contact center system, wherein the routing engine comprises:*

*at least one computer processor; and*

*memory storing instructions that, when executed by the at least one computer processor, cause the at least one computer processor to:*

*determine a measured performance rating of a first agent of a plurality of agents;*

*assign an adjusted performance rating to the first agent when a calculated error in the measured performance rating exceeds a threshold, wherein the adjusted performance rating is different from the measured performance rating and is based at least in part on regression toward a mean performance measurement of one or more other of the plurality of agents;*

*pair a contact with the first agent of the plurality of agents based on the adjusted performance rating of the first agent; and*

*establish a connection between the paired contact and first agent in the contact center system based on the adjusted performance rating of the first agent.*

*44. The system of claim 43, wherein the adjusted performance rating is greater than the measured performance rating.*

*45. The system of claim 43, wherein the adjusted performance rating is a baseline performance rating or an interpolation between the baseline performance rating and the measured performance rating.*

*46. The system of claim 45, wherein the baseline performance rating is a mean performance rating across the plurality of agents.*

*47. The system of claim 45, wherein the baseline performance rating is a below-mean performance rating across the plurality of agents.*

*48. The system of claim 45, wherein a number of contact interactions of the first agent is less than a first threshold number of contact interactions, and wherein the adjusted performance rating comprises the baseline performance rating.*

*49. The system of claim 45, wherein a number of contact interactions of the first agent is between a first threshold number of contact interactions and a second threshold number of contact interactions, and wherein the adjusted performance rating is between the baseline performance rating and the measured performance rating.*

*50. The system of claim 49, wherein the second threshold number of contact interactions comprises an average number of contact interactions across the plurality of agents.*

*51. The system of claim 43, wherein the first agent is a new agent, and wherein the adjusted performance rating comprises the mean performance rating across the plurality of agents.*

*52. An article of manufacture for pairing contacts and agents in a contact center system comprising:*

*a non-transitory computer processor readable medium; and*

*instructions stored on the medium;*

*wherein the instructions are configured to be readable from the medium by at least one computer processor configured to perform contact/agent pairing operations in a routing engine of the contact center system and thereby cause the at least one computer processor to operate so as to:*

*determine a measured performance rating of a first agent of a plurality of agents;*

*assign an adjusted performance rating to the first agent when a calculated error in the measured performance rating exceeds a threshold, wherein the adjusted performance rating is different from the measured performance rating and is based at least in part on regression toward a mean performance measurement of one or more other of the plurality of agents;*

*pair a contact with the first agent of the plurality of agents based on the adjusted performance rating of the first agent; and*

*establish a connection between the paired contact and first agent in the contact center system based on the adjusted performance rating of the first agent.*

*53. The article of manufacture of claim 52, wherein the adjusted performance rating is greater than the measured performance rating.*

*54. The article of manufacture of claim 52, wherein the adjusted performance rating is a baseline performance rating or an interpolation between the baseline performance rating and the measured performance rating.*

*55. The article of manufacture of claim 54, wherein the baseline performance rating is a mean performance rating across the plurality of agents.*

*56. The article of manufacture of claim 54, wherein the baseline performance rating is a below-mean performance rating across the plurality of agents.*

*57. The article of manufacture of claim 54, wherein a number of contact interactions of the first agent is less than a first threshold number of contact interactions, and wherein the adjusted performance rating comprises the baseline performance rating.*

*58. The article of manufacture of claim 54, wherein a number of contact interactions of the first agent is between a first threshold number of contact interactions and a second threshold number of contact interactions, and wherein the adjusted performance rating is between the baseline performance rating and the measured performance rating.*

*59. The article of manufacture of claim 58, wherein the second threshold number of contact interactions comprises an average number of contact interactions across the plurality of agents.*

*60. The article of manufacture of claim 52, wherein the first agent is a new agent, and wherein the adjusted perfor-*

*mance rating comprises the mean performance rating across the plurality of agents.*

* * * * *